United States Patent
Iwamatsu

(10) Patent No.: US 6,683,906 B1
(45) Date of Patent: Jan. 27, 2004

(54) RADIO COMMUNICATION APPARATUS

(75) Inventor: Takanori Iwamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/516,986

(22) Filed: Mar. 1, 2000

(30) Foreign Application Priority Data

Mar. 15, 1999 (JP) .......................................... 11-068834

(51) Int. Cl.⁷ ............................................. H04L 27/30
(52) U.S. Cl. ...................... 375/142; 375/144; 375/148; 375/150; 375/267; 375/343; 375/347; 375/351; 370/320; 370/335; 370/437; 370/462; 455/65; 455/134; 455/137; 455/226.2; 455/226.3; 455/275; 455/277.2
(58) Field of Search ................................. 375/140–142, 375/144, 148, 150, 260, 261, 267, 324, 340, 343, 347, 349, 351; 370/320, 335, 342, 433, 437, 441, 462, 479; 455/52.3, 63, 65, 66, 132, 133, 134, 137, 226.1–226.3, 272, 275, 277.1, 277.2, 303

(56) References Cited

U.S. PATENT DOCUMENTS 5,684,793 A * 11/1997 Kiema et al. ............... 370/335
5,724,378 A * 3/1998 Miki et al. .................. 375/148
6,058,138 A * 5/2000 Fukumasa et al. .......... 375/130
6,208,683 B1 * 3/2001 Mizuguchi et al. ......... 375/140
6,333,934 B1 * 12/2001 Miura ......................... 370/441
6,370,183 B1 * 4/2002 Newson et al. ............. 375/144

FOREIGN PATENT DOCUMENTS

JP              6-132933            5/1994

* cited by examiner

*Primary Examiner*—Stephen Chin
*Assistant Examiner*—Dac V. Ha
(74) *Attorney, Agent, or Firm*—Katten Muchin Zavis Rosenman

(57) ABSTRACT

A radio communication apparatus subjects each signal which is received via a multi-path and demodulated, to a Hadamard transform at each of fingers, by use of an M-ary quadrature coding scheme, obtains correlation values of codes, combines correlation values output from fingers which obtain valid correlation values, and demodulates a received signal based on a maximum correlation value of combined correlation values. The radio communication apparatus includes an operation unit which obtains a difference between a maximum value and a second largest value of the correlation values of a corresponding one of the fingers, and a lock controller which enables and locks the correlation values output from the corresponding one of the fingers when the difference obtained by the operation unit is greater than or equal to a predetermined value.

21 Claims, 30 Drawing Sheets

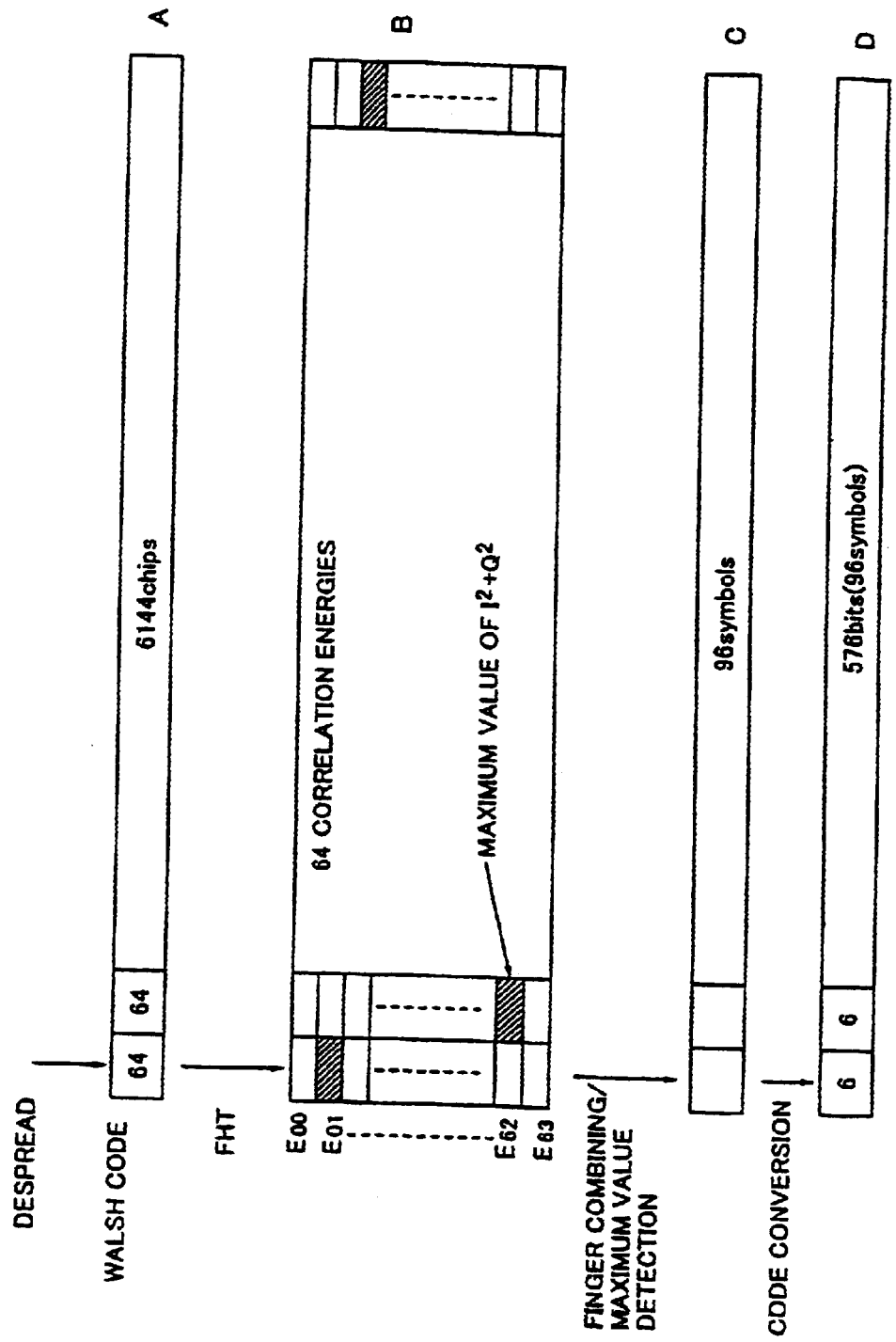

RADIO COMMUNICATION APPARATUS

BACKGROUND OF THE INVENTION

1. Field of the Invention

The present invention generally relates to radio communication apparatuses, and more particularly to a radio communication apparatus which subjects each signal which is received via a multi-path and demodulated, to a Hadamard transform at each finger, by use of an M-ary quadrature coding scheme, obtains correlation values of the codes, combines correlation values output from the fingers which obtain valid correlation values, and demodulates a received signal based on a maximum correlation value of the combined correlation values.

The code division multiple access (CDMA) system is regarded as a mobile communication system of the next generation, and in the United States, a standardized system (N-CDMA) called IS-95 is already reduced to practice. In addition, there is a possibility of the CDMA system being applied to a semi-fixed mobile communication system called wireless local loop (WLL) as a means of infra-structure. Such a system proposed by Qualcomm of the United States is a CDMA system using a chip rate of 1.2288 Mcs, wherein a synchronous detection system using an extrapolated pilot signal is employed for the down-line, and an asynchronous detection system using the M-ary orthogonal modulation is employed for the up-line. In the asynchronous detection system, an amplitude signal is converted into power so as to eliminate a phase error caused by fading or the like, and the communication quality or bit error rate (BER) is improved by employing the RAKE reception technique. The present invention, as will be described later, is suited for application to this kind of radio communication apparatus.

2. Description of the Related Art

FIGS. 1 through 7 and FIGS. 8A through 8C are diagrams for explaining the prior art, more particularly, the standardized system IS-95. FIG. 1 is a system block diagram showing a transmitter part of a mobile station, and FIG. 2 is a diagram showing a signal sequence of the transmitter part. Signals (A) through (E) shown in FIG. 2 are the signals (A) through (E) shown in FIG. 1.

An input information signal is subjected to a cyclic coding in a CRC operation unit 11, and is converted into an error correction code in a convolutional encoder (ENC) 12. This error correction code is subjected to an identical symbol repeating process in a symbol repeating unit 13, so as to unify the input signals in the range of 1.2 kbps to 9.6 kbps to the signal (A) of 9.6 kbps. The signal (A) is further subjected to a buffering process in an interleaver 14. A signal sequence (B) of 28.8 kbps is read from the interleaver 14 and input to an M-ary (64) orthogonal modulator 15.

The 64-ary orthogonal modulator 15 converts the 6-bit input data to a corresponding 64-bit Walsh code (C), that is, spreads the input data by 64/6 times. For example, the 6-bit input data "000000" is converted into a 64-bit Walsh code "00000000 . . . 00000000", and the 6-bit input data "000001" is converted into a 64-bit Walsh code "01010101 . . . 01010101". Such Walsh codes (C) are finally output from the 64-ary orthogonal modulator 15 as a signal (D) of 307.2 kcps.

A multiplier 17 multiplies to the signal (D) a PN code (user code or long code) LCD which is generated for each user by a long code generator 16. As a result, a spread code sequence (E) of 1.2288 Mcps is output from the multiplier 17 and is supplied to a multiplier $20_1$ provided for the I-channel and a multiplier $20_2$ provided for the Q-channel. The multiplier $20_1$ multiplies to the spread code sequence (E) a PN code (short code) SCD for identifying the base station, which is generated from a short code generator 18 and is received via a shifter 19. On the other hand, the multiplier $20_2$ multiplies to the spread code sequence (E) the PN code SCD which is generated from the short code generator 18.

An output of the multiplier $20_1$ is passed through a filter $22_1$ and a digital-to-analog (D/A) converter $23_1$ and converted into an analog signal before being supplied to a quadrature phase shift keying (QPSK) modulator 24. An output of the multiplier $20_2$ is passed through a ½ chip delay unit 21, a filter $22_2$ and a D/A converter $23_2$ and converted into an analog signal before being supplied to the QPSK modulator 24. Since the ½ chip delay unit 21 provides a ½ chip shift between the I-channel and the Q-channel, an output of the QPSK modulator 24 becomes an offset QPSK (OQPSK) modulated signal. By this OQPSK modulation, no phase change of $\pi$ occurs, and the phase change becomes $\pi/2$ at the maximum. For this reason, even under an extreme band limitation, the signal envelope only dips slightly, and no zero-point occurs. An OQPSK modulated signal output from the QPSK modulator 24 is converted into a radio frequency signal in a transmitting radio frequency (RF) unit (Tx) 25 and is transmitted to the base station via an antenna A0.

FIG. 3 is a system block diagram showing a receiver part (reverse link demodulator part) of the base station. In addition, FIG. 4 is a diagram for explaining a service area of the base station, and FIG. 5 is a diagram for explaining asynchronous detection. Further, FIG. 6 is a system block diagram showing fingers forming the receiver part, and FIG. 7 is a diagram showing a signal sequence of the receiver part.

As shown in FIG. 4, 1 cell is divided into 3 sectors, and 2 reception (diversity) antennas are provided with respect to 1 sector. A maximum number of antennas capable of simultaneously communicating with a mobile station MS which is located at an arbitrary position is 4, namely, A11, A12, A21 and A22, in this particular case. Hence, 4 corresponding antennas A1 through A4 are shown in FIG. 3.

In FIG. 3, the received signals from the antennas A1 through A4 are amplified and converted into intermediate frequency signals IF in corresponding receiving RF units (Rx) $31_1$ through $31_4$, and demodulated into orthogonal demodulated data (I1, Q1) through (I4, Q4) in corresponding QPSK demodulators (DEM) $32_1$ through $32_4$. The orthogonal demodulated data (I1, Q1) through (I4, Q4) are selected by a signal selector 33 which operates under the control of a searcher 40, and input to fingers $34_1$ through $34_4$. In this state, the received wave is not necessarily supplied constantly to each finger, and each finger operates under conditions, such as antenna selection and delay time $PN_{offset}$, which are specified by the searcher. Hence, various combinations are actually permitted for the connection of the QPSK demodulators $32_1$ through $32_4$ and the fingers $34_1$ through $34_4$.

FIG. 6 shows the construction of the fingers $34_1$ through $34_4$. In a despreader 41 of the finger $34_1$, the input demodulated data I1, Q1 are respectively despread by a correlator 42 based on the short code $PN_{offset}$ (PNI1, PNQ1) supplied from the searcher 40. The short codes PNI1, PNQ1 correspond to the short code SCD of the transmitter end, and PNI1 is phase (chip) synchronized to the demodulated data I1 while PNQ1 is phase (chip) synchronized to the demodulated data Q1.

Further, output data I1, Q1 of the correlator 40 are despread by corresponding multipliers $43_1$ and $43_2$ based on a long code LCD corresponding to the user code LCD of the transmitting end. In addition, an adder $44_1$ adds 4 consecutive despread codes I1 from the multipliers $43_1$, and an adder $44_2$ adds 4 consecutive despread codes Q1 from the multiplier $43_2$. If no chip error occurs during the transmission, output data I1, Q1 (A) of the adders $44_1$ and $44_2$ correspond to the output Walsh code of the 64-ary orthogonal modulator 15 of the transmitting end. Actually, however, the output data I1, Q1 (A) of the adders $44_1$ and $44_2$ do not necessarily correspond to the output Walsh code of the 64-ary orthogonal modulator 15 due to the chip error or the like introduced during the transmission.

The output data I1, Q1 (A) of the adders $44_1$ and $44_2$ are subjected to the Hadamard transform in corresponding fast Hadamard transform units (FHT) $45_1$ and $45_2$. In other words, the input data I1, Q1 and 64 kinds of Walsh code sequences are subjected to matrix operations, so that correlation values ($I_{00}$ through $I_{63}$), ($Q_{00}$ through $Q_{63}$) are generated depending on the correlation of the codes. Energy calculation units $46_{00}$ through $46_{63}$ obtain powers ($I_{00}^2+Q_{00}^2$) through ($I_{63}^2+Q_{63}^2$) for each of the correlation values, and output correlation energies $E_{00}$ through $E_{63}$ corresponding to Walsh code numbers 0 through 63.

The correlation energies $E_{00}$ through $E_{63}$ are input to a gate circuit 47 and to a maximum value selector (MXS) 48. The maximum value selector 48 selects a maximum correlation energy MXE from the correlation energies $E_{00}$ through $E_{63}$. A comparator (CMP) 49 compares the maximum correlation energy MXE and a predetermined threshold value TH, and closes the gate circuit 47 when MXE>TH and otherwise opens the gate circuit 47. In other words, the output correlation energies $E_{00}$ through $E_{63}$ of the energy calculation units $46_{00}$ through $46_{63}$ are output from the finger $34_1$ and contribute to the RAKE combining at the latter stage only when the maximum energy MXE exceeds the predetermined threshold value TH. Similar operations are carried out in the other fingers $34_2$ through $34_4$. Under the RAKE reception system, the correlation value level is made large by combining only the correlation value outputs from the valid fingers of each of the correlation value outputs (energies) of the multi-path which includes 4 paths at the maximum in FIG. 3, so as to increase the certainty of the correlation value.

Returning now to the description of FIG. 3, the output correlation energies $E_{00}$ through $E_{63}$ from the fingers $34_1$ through $34_4$ are combined (added) for each of the correlation energies $E_{00}$ through $E_{63}$ in the combining units $35_{00}$ through $35_{63}$, and combined energies $G_{00}$ through $G_{63}$ are output from the combining units $35_{00}$ through $35_{63}$. A maximum value selector 36 selects a maximum combined energy MXG of the combined energies $G_{00}$ through $G_{63}$, and demodulates a Walsh code (number) MXW corresponding to this maximum combined energy MXG. Under the asynchronous detection system, the phase component is eliminated by converting the demodulated signals I, Q into power ($I^2+Q^2$), so as to prevent phase noise caused by fading and to prevent deterioration of a local signal caused by frequency error. FIG. 5 is a diagram for explaining the asynchronous detection in this state. Even if the demodulated phase changes (rotates) by $\Delta\phi$ between timings t1 and t2, the maximum combined energy MXG=$G_{15}$ is obtained at the timing t1, and the maximum combined energy MXG=$G_{32}$ is obtained at the timing t2. The Walsh code MXW is converted into a corresponding 6-bit data by a code converter 37, deinterleaved in a deinterleaver 38, subjected to a Viterbi decoding in a Viterbi decoder 39, and output as received data RD.

According to the conventional system described above, the finger locked state occurs when MXE>TH as a result of the comparison of the maximum combined energy MXE of the combined energies $G_{00}$ through $G_{63}$ and the predetermined threshold value TH.

FIG. 8A is a diagram showing an example of a correlation energy versus Eb/No characteristic. In FIG. 8A, the ordinate indicates the correlation energy, and the abscissa indicates Eb/No, that is, the signal-to-noise (S/N) ratio per bit. Generally, the correlation energy is high when Eb/No (reception quality) is high, and the correlation energy decreases when Eb/No decreases, as will be described hereunder.

FIG. 8B is a diagram showing an example of a case where Eb/No is sufficiently high. In FIG. 8B, the ordinate indicates the correlation energy, and the abscissa indicates energy types $E_{00}$ through $E_{63}$ corresponding to the Walsh code numbers $W_{00}$ through $W_{63}$. If Eb/No (communication quality) is sufficiently high and the Walsh code $W_{15}$ sent from the transmitting end is correctly demodulated into the code $W_{15}$ at the receiving end, the correlation energy $E_{15}$ becomes MXE at the maximum, and the other correlation energies all become "0". Accordingly, the conventional system can accurately judge whether or not XXE>TH1.

FIG. 8C is a diagram showing an example of a case where Eb/No decreases. In FIG. 8B, the ordinate indicates the correlation energy, and the abscissa indicates energy types $E_{00}$ through $E_{63}$ corresponding to the Walsh code numbers $W_{00}$ through $W_{63}$. If Eb/No (communication quality) decreases, burst error or the like mixes into the Walsh code $W_{15}$ sent from the transmitting end, and the correlation energy $E_{15}$ decreases in a received code $W_{15}$' which includes error and is demodulated at the receiving end. As a result, the correlation energy increases in relation to the other codes, and in the conventional system it is impossible to detect whether or not $E_{15}$>TH1, that is, whether or not the finger locked state occurs.

In this case, if the threshold value TH1 is decreased to a threshold value TH2, it is possible to detect the finger locked state. However, as may be seen from FIG. 8C, a correct RAKE combining operation cannot be expected by outputting (locking) fingers for which a sufficiently accurate judgement cannot be made to determine which one of the energies $E_{15}$ and $E_{45}$ is larger. Hence, according to the conventional system, a necessary finger may be disabled or an unnecessary finger may be enabled when Eb/No decreases, thereby deteriorating the reception quality. In addition, it is difficult to set the threshold value TH so as to improve the reception quality.

Moreover, in mobile communication systems in general, the transmission power of the mobile station MS is remotely controlled so that Eb/No obtained after combining the fingers becomes a desired value. For this reason, as the number of fingers which are combined becomes large, Eb/No per finger may decrease accordingly, thereby making it more difficult to detect the finger locked state for each of the fingers.

Furthermore, in this type of communication system, the fingers are arranged depending on an instruction from the searcher 40. But in the conventional system, even in a case where a plurality of fingers receive identical or extremely similar signals, these fingers will assume the finger locked state together, and the fingers will be combined in this state.

However, there is virtually no gain in the RAKE reception even if identical signals are combined, and the plurality of fingers will be used in vain. In addition, the number of fingers actually being combined and the number of fingers substantially contributing to the RAKE combining do not match. Consequently, undesirable effects are introduced to other controllers, such as a remote control to decrease the transmission power of the mobile station MS.

SUMMARY OF THE INVENTION

Accordingly, it is a general object to provide a novel and useful radio communication apparatus in which the problems described above are eliminated.

Another and more specific object of the present invention is to provide a radio communication apparatus which can always appropriately combine fingers (RAKE) depending on the communication environment and the location of the terminal station.

Still another object of the present invention is to provide a radio communication apparatus which subjects each signal which is received via a multi-path and demodulated, to a Hadamard transform at each of fingers, by use of an M-ary quadrature coding scheme, obtains correlation values of codes, combines correlation values output from fingers which obtain valid correlation values, and demodulates a received signal based on a maximum correlation value of combined correlation values, where the radio communication apparatus comprises an operation unit which obtains a difference between a maximum value and a second largest value of the correlation values of a corresponding one of the fingers, and a lock controller which enables and locks the correlation values output from the corresponding one of the fingers when the difference obtained by the operation unit is greater than or equal to a predetermined value. According to the radio communication apparatus of the present invention, it is possible to always obtain an appropriate combining of the fingers (RAKE) depending on the communication environment and the location of the terminal station, and the communication quality is improved.

A further object of the present invention is to provide radio communication apparatus which subjects each signal which is received via a multi-path and demodulated, to a Hadamard transform at each of fingers, by use of an M-ary quadrature coding scheme, obtains correlation values of codes, combines correlation values output from fingers which obtain valid correlation values, and demodulates a received signal based on a maximum correlation value of combined correlation values, where the radio communication apparatus comprises a maximum value detector which obtains a maximum correlation value of a corresponding one of the fingers, a combining unit which combines, at a predetermined ratio, the maximum correlation value obtained by the maximum value detector and a maximum correlation value obtained after combining the fingers, and a lock controller which enables and locks output of the correlation values from the corresponding one of the fingers when an output of the combining unit is greater than or equal to a predetermined value. According to the radio communication apparatus of the present invention, it is possible to always obtain an appropriate combining of the fingers (RAKE) depending on the communication environment and the location of the terminal station, and the communication quality is improved.

Another object of the present invention is to provide a radio communication apparatus which subjects each signal which is received via a multi-path and demodulated, to a Hadamard transform at each of fingers, by use of an M-ary quadrature coding scheme, obtains correlation values of codes, combines correlation values output from fingers which obtain valid correlation values, and demodulates a received signal based on a maximum correlation value of combined correlation values, where the radio communication apparatus comprises a maximum value detector which obtains a maximum correlation value of a corresponding one of the fingers, a code generator which generates an M-ary quadrature code corresponding to the maximum correlation value of the corresponding one of the fingers, a comparator which compares the M-ary quadrature code generated by the code generator and an M-ary quadrature code corresponding to the maximum correlation value obtained after combining the fingers, a selector which selects the maximum correlation value of the corresponding one of the fingers or a predetermined coefficient multiple thereof when no match is detected by the comparator, and selects the maximum correlation value obtained after combining the fingers or a predetermined coefficient multiple thereof when a match is detected by the comparator, and a lock controller which enables and locks output of the correlation values from the corresponding one of the fingers when an output of the selector is greater than or equal to a predetermined value. According to the radio communication apparatus of the present invention, it is possible to always obtain an appropriate combining of the fingers (RAKE) depending on the communication environment and the location of the terminal station, and the communication quality is improved.

Still another object of the present invention is to provide a radio communication apparatus which subjects each signal which is received via a multi-path and demodulated, to a Hadamard transform at each of fingers, by use of an M-ary quadrature coding scheme, obtains correlation values of codes, combines correlation values output from fingers which obtain valid correlation values, and demodulates a received signal based on a maximum correlation value of combined correlation values, where the radio communication apparatus comprises a comparator which compares demodulate data for an arbitrary combination of 2 paths, and a lock controller which disables and unlocks output of the correlation values from a corresponding one of the fingers based on a detection of a match or an approximate match in the comparator. According to the radio communication apparatus of the present invention, it is possible to always obtain an appropriate combining of the fingers (RAKE) depending on the communication environment and the location of the terminal station, and the communication quality is improved.

A further object of the present invention is to provide a radio communication apparatus which subjects each signal which is received via a multi-path and demodulated, to a Hadamard transform at each of fingers, by use of an M-ary quadrature coding scheme, obtains correlation values of codes, combines correlation values output from fingers which obtain valid correlation values, and demodulates a received signal based on a maximum correlation value of combined correlation values, where the radio communication apparatus comprises a comparator which compares M-ary quadrature codes corresponding to maximum correlation values obtained for an arbitrary combination of 2 fingers, and a lock controller which disables and unlocks output of the correlation values from one of the 2 fingers when a match is detected by the comparator. According to the radio communication apparatus of the present invention, it is possible to always obtain an appropriate combining of the fingers (RAKE) depending on the communication environment and the location of the terminal station, and the communication quality is improved.

Other objects and further features of the present invention will be apparent from the following detailed description when read in conjunction with the accompanying drawings.

BRIEF DESCRIPTION OF THE DRAWINGS

FIG. 7 is a diagram showing a signal sequence of the receiver part;

DESCRIPTION OF THE PREFERRED EMBODIMENTS

Figure 9:
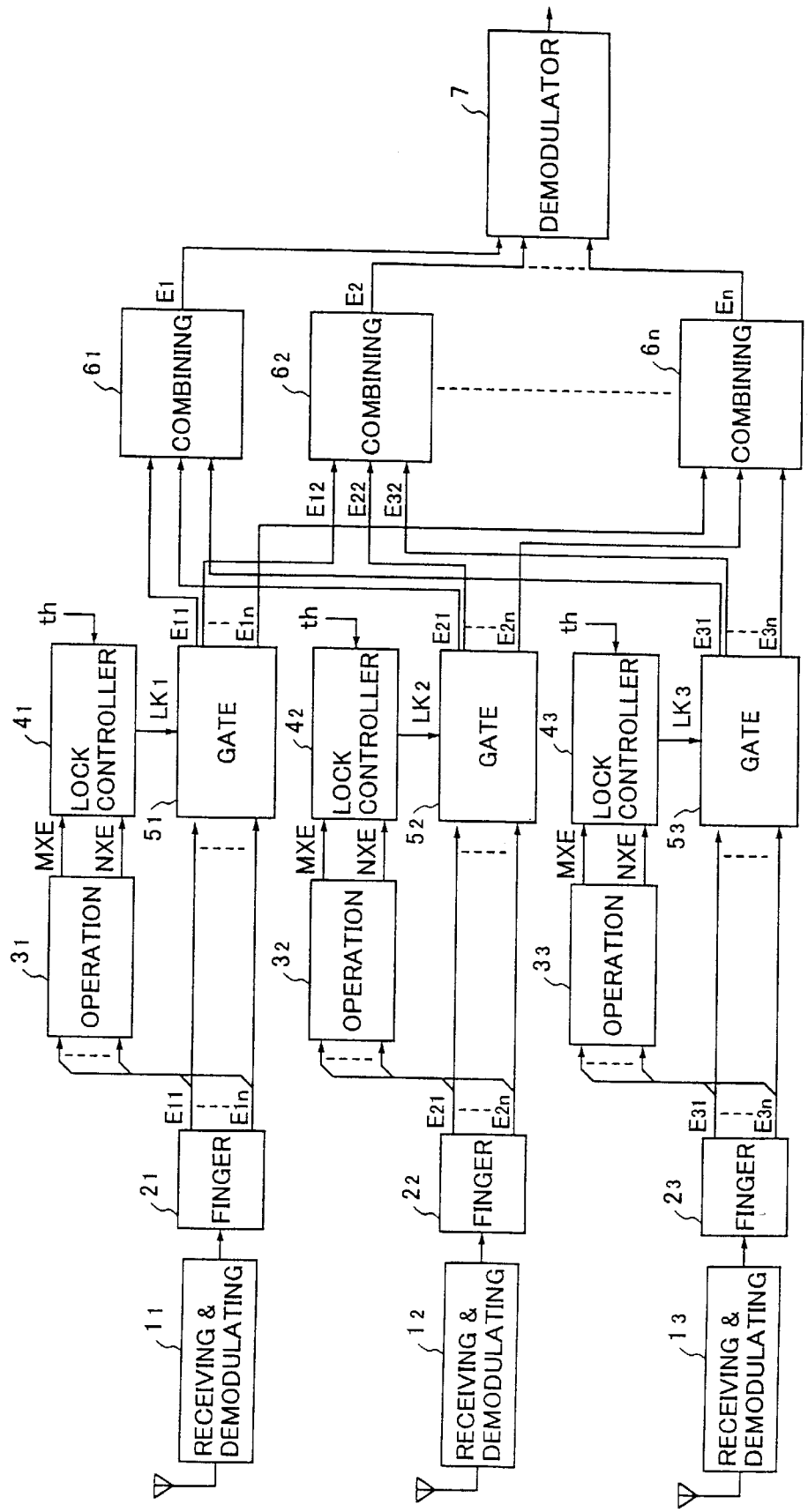
FIG. 9 is a system block diagram for explaining the operating principle of the present invention.

First, a description will be given of the operating principle of the present invention, by referring to FIG. 9. FIG. 9 is a system block diagram for explaining the operating principle of the present invention.

A radio communication apparatus includes receiving and demodulating units $1_1$ through $1_3$, fingers $2_1$ through $2_3$, operation units $3_1$ through $3_3$, lock controllers $4_1$ through $4_3$, gates $5_1$ through $5_3$, combining units $6_1$ through $6_n$, and a demodulator 7 which are connected as shown in FIG. 9.

According to a first aspect of the present invention, each signal which is received via a multi-path and demodulated is subjected to a Hadamard transform at each finger, by use of an M-ary quadrature coding scheme, so that correlation values $E_{11}$ through $E_{1n}$ of the codes are output from the finger $2_1$, and correlation values $E_{21}$ through $E_{2n}$ and correlation values $E_{31}$ through $E_{3n}$ are similarly output from the corresponding fingers $2_2$ and $2_3$. The valid correlation values output from the fingers $2_1$ through $2_3$ are combined in the combining units $6_1$ through $6_n$, and the demodulator 7 demodulates the received signal based on maximum correlation value E1, E2, ..., or En.

Under the above precondition, each of the operation units $3_1$ through $3_3$ obtains a difference between a maximum value MXE and a second largest value NXE of the correlation values output from the corresponding one of the fingers $2_1$ through $2_3$. Each of the lock controllers $4_1$ through $4_3$ opens the corresponding one of the gates $5_1$ through $5_3$ with respect to the correlation values output from the fingers $2_1$ through $2_3$, depending on whether or not the difference MXE–NXE output from the corresponding one of the operation units $3_1$ through $3_3$ is greater than or equal to a predetermined threshold value th. In other words, each of the lock controllers $4_1$ through $4_3$ enables or locks the correlation value output of the corresponding one of the fingers $2_1$ through $2_3$ by a corresponding one of control signals LK1 through LK3.

The correlation values obtained from the fingers $2_1$ through $2_3$ are such that the difference MXE–NXE is large when the reception quality (Eb/No) is satisfactory. However, when the reception quality (Eb/No) of the fingers $2_1$ through $2_3$ decreases, the difference MXE–NXE becomes small, and it becomes impossible to determine which one of the values MXE and NXE is the maximum value. In other words, the correlation values indicate the reception (demodulation) limit of this type of radio communication apparatus. According to a first aspect of the present invention, it is possible to always appropriately combine the fingers (RAKE) depending on the communication environment, by enabling or locking the correlation value output of a finger when the difference MXE–NXE of the correlation values is greater than or equal to the predetermined threshold value th at this finger.

According to a second aspect of the present invention, the operation unit of the first aspect of the present invention desirably includes a maximum value detector for detecting a maximum value from input correlation values, a decoder for decoding an input port of the correlation value corresponding to the detected maximum value, and a detection controller for holding the maximum value which is detected the first time and disabling or unlocking the correlation value input of the input port which is specified by the decoder when detected the second time. In this case, it is possible to accurately detect the maximum value and the second largest value of the correlation values by use of a simple construction.

According to a third aspect of the present invention, the radio communication apparatus under the above described precondition includes a maximum value detector for obtaining a maximum correlation value of a finger, a combining unit for combining, at a predetermined ratio, the maximum correlation value of the finger and a maximum correlation value obtained after combining the fingers, and a lock controller for enabling or locking an output of an arbitrary finger when the output of the combining unit is greater than or equal to a predetermined value with respect to the maximum correlation value from this arbitrary finger.

For example, in a base station BS of the mobile communication system, when a plurality of fingers are combined, the base station BS remotely controls a mobile station MS to reduce the transmission output when Eb/No obtained after combining the fingers is improved. As a result, the correlation value (absolute level) per finger decreases at the base station BS, and the finger lock detection or maintaining the finger locked state becomes difficult for some fingers. If the finger locked state is not maintained, Eb/No obtained after combining the fingers decreases at the base station BS, and the transmission output control of the base station BS with respect to the mobile station MS becomes unstable due to the need to operations such as remotely controlling the mobile station MS to increase the transmission power.

But according to the third aspect of the present invention, the correlation value (energy) obtained after combining the fingers is added (combined) to the correlation values (energies) output from the fingers. For this reason, with regard to the finger lock detection and the maintaining of the finger locked state, each finger can carry out an effective finger lock detection and maintain the finger locked state, even when the correlation values (energies) decrease for each finger.

Preferably, according to a fourth aspect of the present invention, the combining unit of the third aspect of the present invention combines, at the predetermined rate, the maximum correlation value obtained after combining the fingers on condition that the lock controller is locking the correlation value output. In this case, no help is provided with respect to the finger which cannot lock by itself, and the maximum correlation value obtained after combining the fingers is added only with respect to the satisfactory finger which can lock by itself, so that the finger locked state of the satisfactory finger can be maintained.

In addition, according to a fifth aspect of the present invention, the radio communication apparatus of the third aspect of the present invention further includes a code generator for generating an M-ary quadrature code corresponding to the maximum correlation value of the finger, and a comparator for comparing the M-ary quadrature code generated by the code generator and an M-ary quadrature code corresponding to the maximum correlation value obtained after combining the fingers, and the combining unit combines the maximum correlation value obtained after combining the fingers, at the predetermined rate, on condition that the codes compared in the comparator match.

Even when the maximum correlation value of the finger does not have a sufficient absolute level for enabling the finger to lock by itself, the reception characteristic of the finger itself may be satisfactory, and the difference between the maximum correlation value and the second largest correlation value. In such a case, it may be clearly seen that combining the fingers will satisfactorily contribute to the maximum correlation value obtained after combining the fingers.

According to the fifth aspect of the present invention, the maximum correlation value obtained after combining the fingers is added on condition that the M-ary quadrature code corresponding to the maximum correlation value of the finger and the M-ary quadrature code corresponding to the maximum correlation value obtained after combining the fingers which are compared match. For this reason, it is possible to help the finger which cannot lock by itself.

Preferably, according to a sixth aspect of the present invention, the radio communication apparatus of the fifth aspect of the present invention further includes a moving average unit for obtaining a moving average with respect to the output of the comparator which indicates a match or no match, and the combining unit combines, at the predetermined ratio, the maximum correlation value obtained after combining the fingers on condition that an output of the moving average unit is greater than or equal to a predetermined value.

In the receiving environment which is greatly affected by noise and fading, such as the case of the mobile communication system, the match detection output and the no-match detection output of the comparator may occur at random. However, according to the sixth aspect of the present invention, the moving average of the comparator output is obtained, so as to stabilize the control of the finger locking and unlocking.

Furthermore, according to a seventh aspect of the present invention, the combining unit of the fifth or sixth aspect of the present invention desirably combines, at the predetermined rate, the maximum correlation value obtained after combining the fingers on condition that the lock controller locks the correlation value output.

According to an eighth aspect of the present invention, the radio communication apparatus, under the above described precondition, includes a maximum value detector for obtaining a maximum correlation value of each finger, a code generator for generating an M-ary quadrature code corresponding to the maximum correlation value of each finger, a comparator for comparing the M-ary quadrature code generated by the code generator and an M-ary quadrature code corresponding to a maximum correlation value obtained after combining the fingers, a selector for selecting the maximum correlation value of each finger or a value multiplied by a predetermined coefficient to this maximum correlation value when no match is detected by the comparator and selecting the maximum correlation value obtained after combining the fingers or a value multiplied by a predetermined coefficient to this maximum correlation value when match is detected by the comparator, and a lock controller for enabling or locking the correlation value output of a finger when a corresponding output of the selector is greater than or equal to a predetermined value.

In the eighth aspect of the present invention, the maximum correlation value obtained after combining the fingers is used as the lock detection target level when the compared M-ary quadrature codes match. On the other hand, when the compared M-ary quadrature codes do not match, the maximum correlation value of the finger is used as the lock detection target level. Hence, it is possible to accurately combine the satisfactory fingers.

Preferably, according to a ninth aspect of the present invention, the comparator of the eighth aspect of the present invention is provided with a moving average unit for obtaining a moving average of the comparator match or no-match output, and the selector selects the maximum correlation value obtained after combining the fingers or the value multiplied by the predetermined coefficient to this maximum correlation value, on condition that an output of the moving average unit is greater than or equal to a predetermined value. Hence, in this case, it is possible to stabilize the lock and unlock control of the fingers.

Desirably, according to a tenth aspect of the present invention, the selector of the eighth or ninth aspect of the present invention selects the maximum correlation value obtained after combining the fingers or the value multiplied by the predetermined coefficient to this maximum correlation value, on condition that the lock controller locks the correlation value output. Hence, the finger which locks by itself is favored.

According to an eleventh aspect of the present invention, the radio communication apparatus, under the above described precondition, includes a comparator for comparing demodulated data for an arbitrary combination of 2 paths, and a lock controller for locking a correlation value output of a corresponding one of fingers when the demodulated data compared in the comparator match or approximately match. Thus, it is possible to effectively prevent combining of one of the fingers which will only unnecessarily increase Eb/No obtained after combining the fingers, in a case where approximately the same signals are received in duplicate. Such a situation where approximately the same signals are received in duplicate can occur at various locations of the mobile station MS, but the eleventh aspect of the present invention can always realize appropriate combining of the fingers (RAKE) depending on the location of the terminal station.

In addition, according to a twelfth aspect of the present invention, the radio communication apparatus, under the above described precondition, includes a comparator for comparing M-ary quadrature codes corresponding to maximum correlation values obtained for an arbitrary combination of 2 fingers, and a lock controller for disabling or unlocking a correlation value output of one of the fingers when the codes compared in the comparator match.

In the twelfth aspect of the present invention, the M-ary quadrature codes after the demodulation are compared, and thus, the comparison can be realized by relatively simple construction and control.

Preferably, according to a thirteenth aspect of the present invention, the comparator of the twelfth aspect of the present invention compares the M-ary quadrature codes corresponding to the maximum correlation values and the second largest correlation values which are respectively obtained for the arbitrary combination of the 2 fingers.

According to the thirteenth aspect of the present invention, it is possible to carry out a further accurate match detection by comparing the M-ary quadrature codes corresponding to the maximum correlation values and the second largest correlation values of the fingers and the M-ary quadrature codes corresponding to the maximum correlation values and the second largest correlation values obtained after combining the fingers.

In addition, various comparisons and detections may be made using a plurality of M-ary quadrature codes. For example, suppose that a maximum value code w0 and a second largest value code w1 are extracted at a first finger, and a maximum value code w1 and a second largest value code w0 are extracted at a second finger. This situation corresponds to a case where, as a result of receiving demodulated data including similar chip error at both the first and second fingers, the difference between the maximum value and the second largest value of the correlation values is small, and th maximum value code w1 is extracted at the first finger but the maximum value code w0 is extracted at the second finger. In other words, approximately the same signals are received at the first and second fingers in this situation. According to the thirteenth aspect of the present invention, it is possible to effectively eliminate the unnecessary one of the fingers.

According to a fourteenth aspect of the present invention, the comparator in any of the eleventh through thirteenth aspects of the present invention includes means for obtaining a correlation of 2 inputs. By use of this means for obtaining the correlation, it is possible to easily judge whether or not the compared data or, the compared codes, match or approximately match, using a simple construction.

Preferably, according to a fifteenth aspect of the present invention, the correlation values in any of the first through fourteenth aspects of the present invention are obtained by carrying out a QPSK modulation with respect to M-ary quadrature codes at the transmitting end, carrying out a QPSK demodulation at the receiving end, carrying out an Hadamard transform using an M-ary quadrature code sequence with respect to demodulated signals I and Q to obtain correlation values (I1 through In) and (Q1 through Qn) of the codes, and finally obtaining sums of squares $(I1^2+Qn^2)$ through $(In^2+Qn^2)$.

Preferably, according to a sixteenth aspect of the present invention, the demodulated signals subject to the Hadamard transform in the fifteenth aspect of the present invention are obtained by carrying out a spreading using a predetermined code at the transmitting end, and carrying out a despreading using the same predetermined code at the receiving end.

Next, a description will be given of various embodiments of the radio communication apparatus according to the present invention, by referring to FIG. 10 and the subsequent drawings. In FIGS. 10 through 29, the same parts are designated by the same reference numerals.

Figure 1:
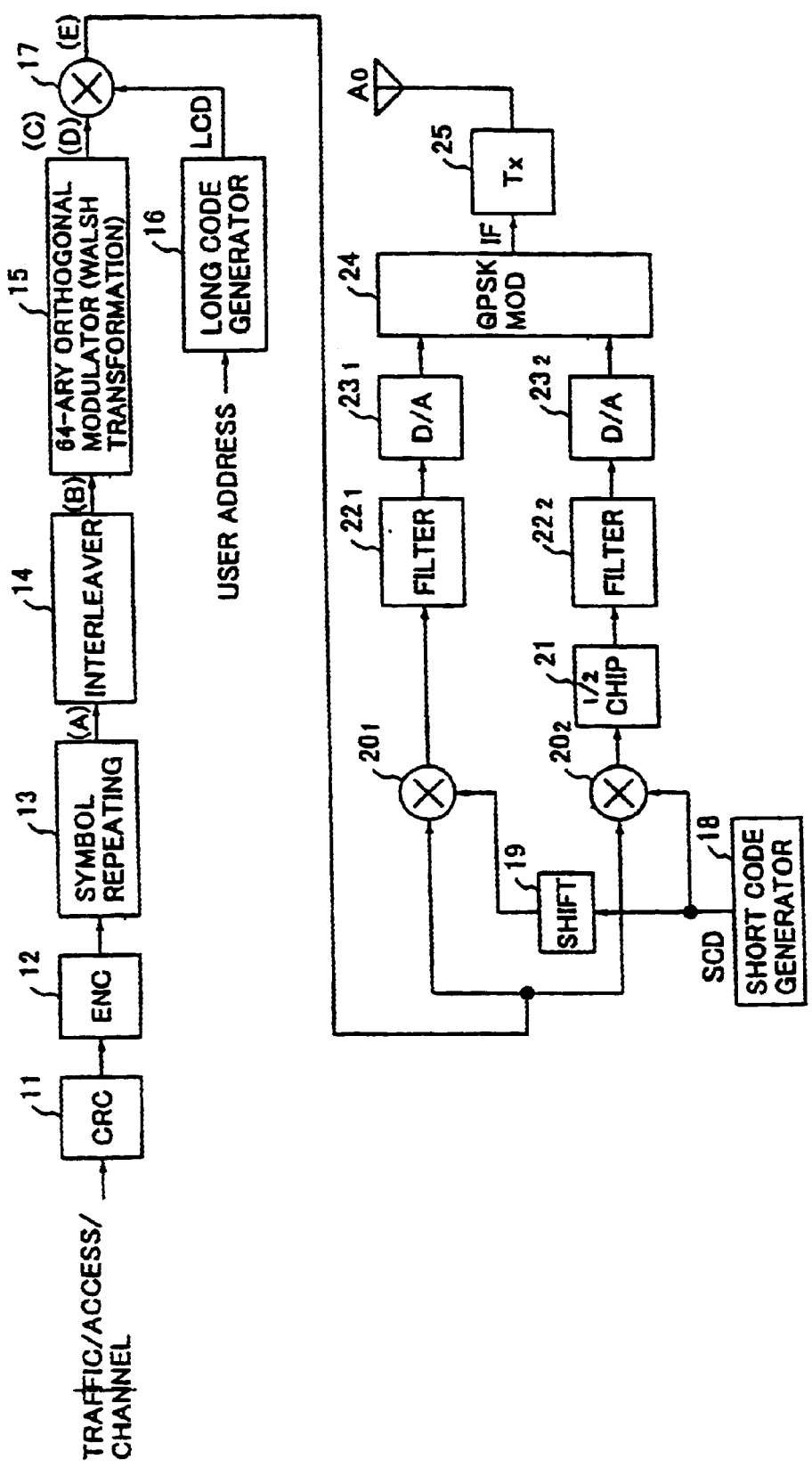
FIG. 1 is a system block diagram showing a transmitter part of a mobile station.
Figure 2:
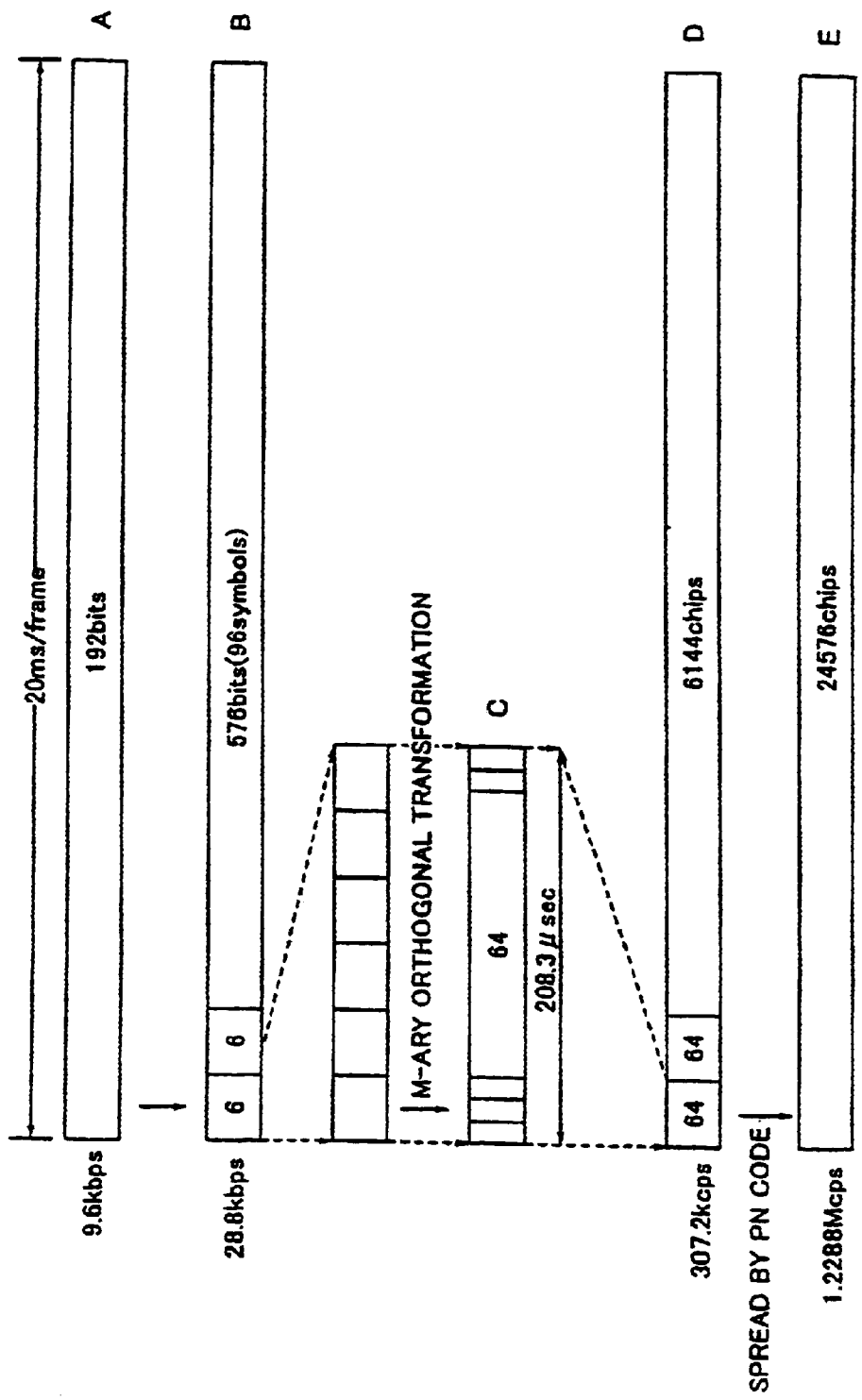
FIG. 2 is a diagram showing a signal sequence of the transmitter part.
Figure 3:
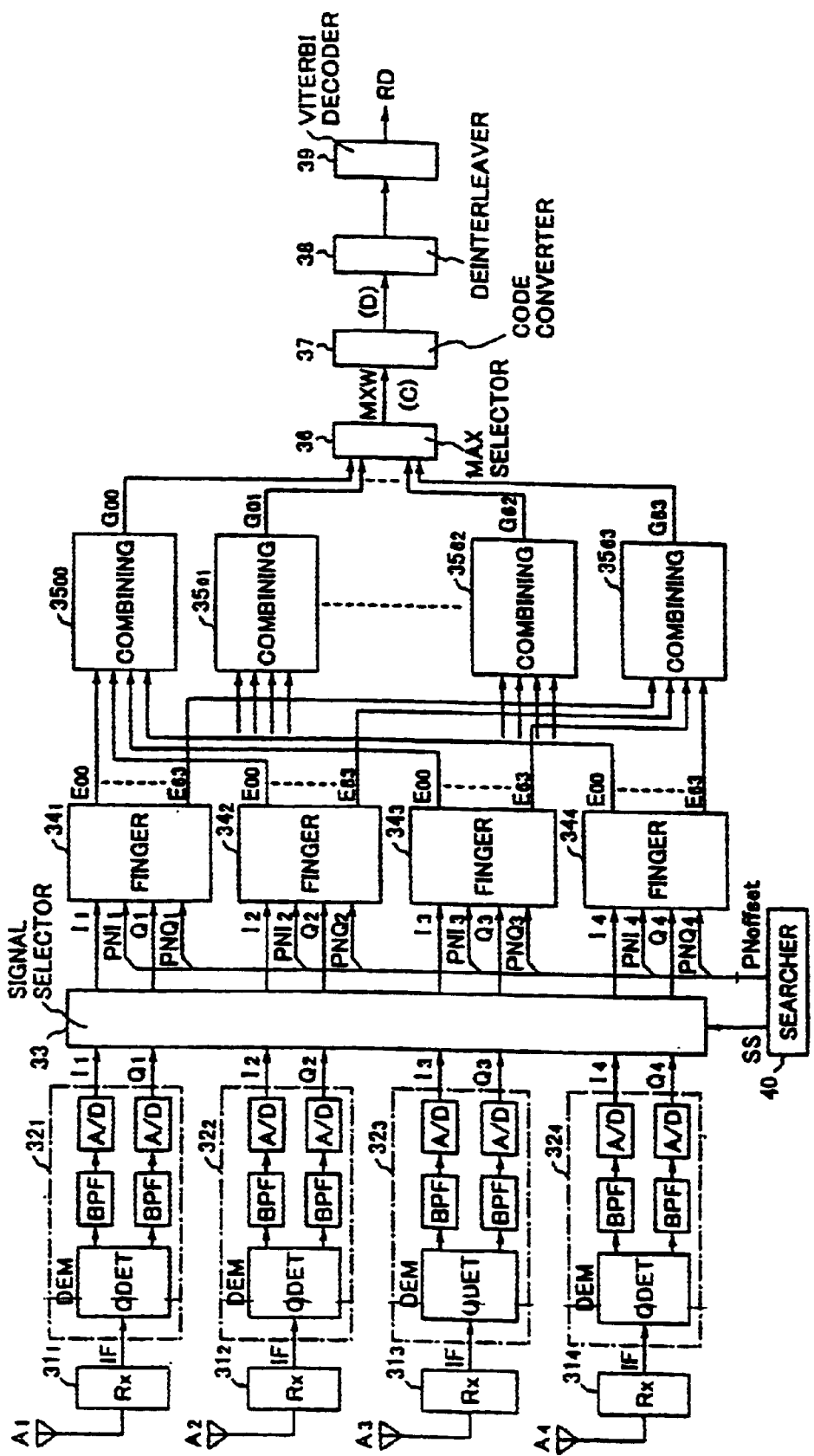
FIG. 3 is a system block diagram showing a receiver part of the base station.
Figure 4:
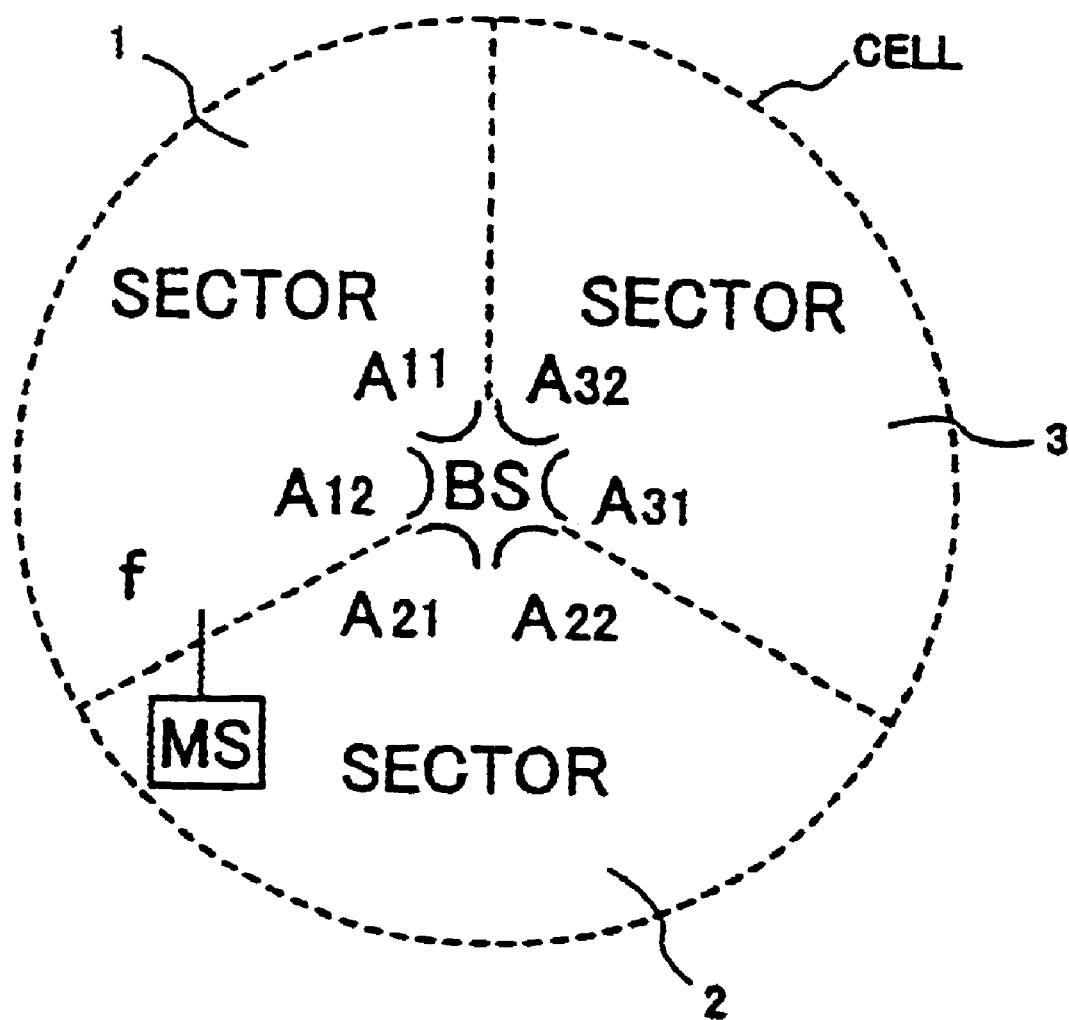
FIG. 4 is a diagram for explaining a service area of the base station.
Figure 5:
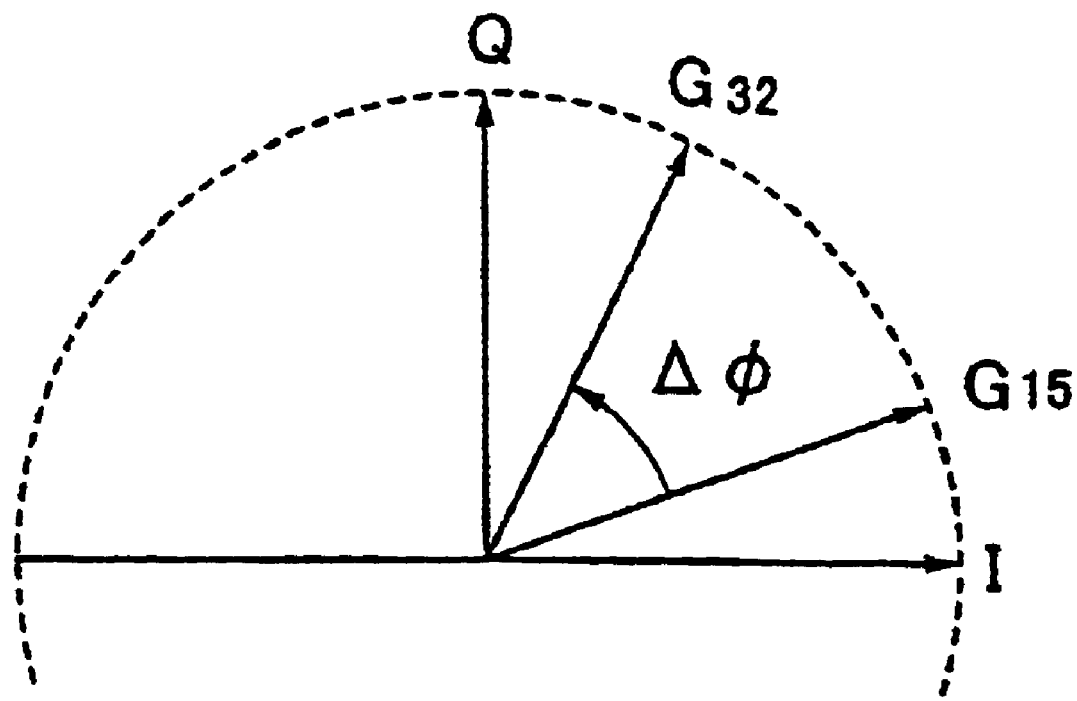
FIG. 5 is a diagram for explaining asynchronous detection.
Figure 6:
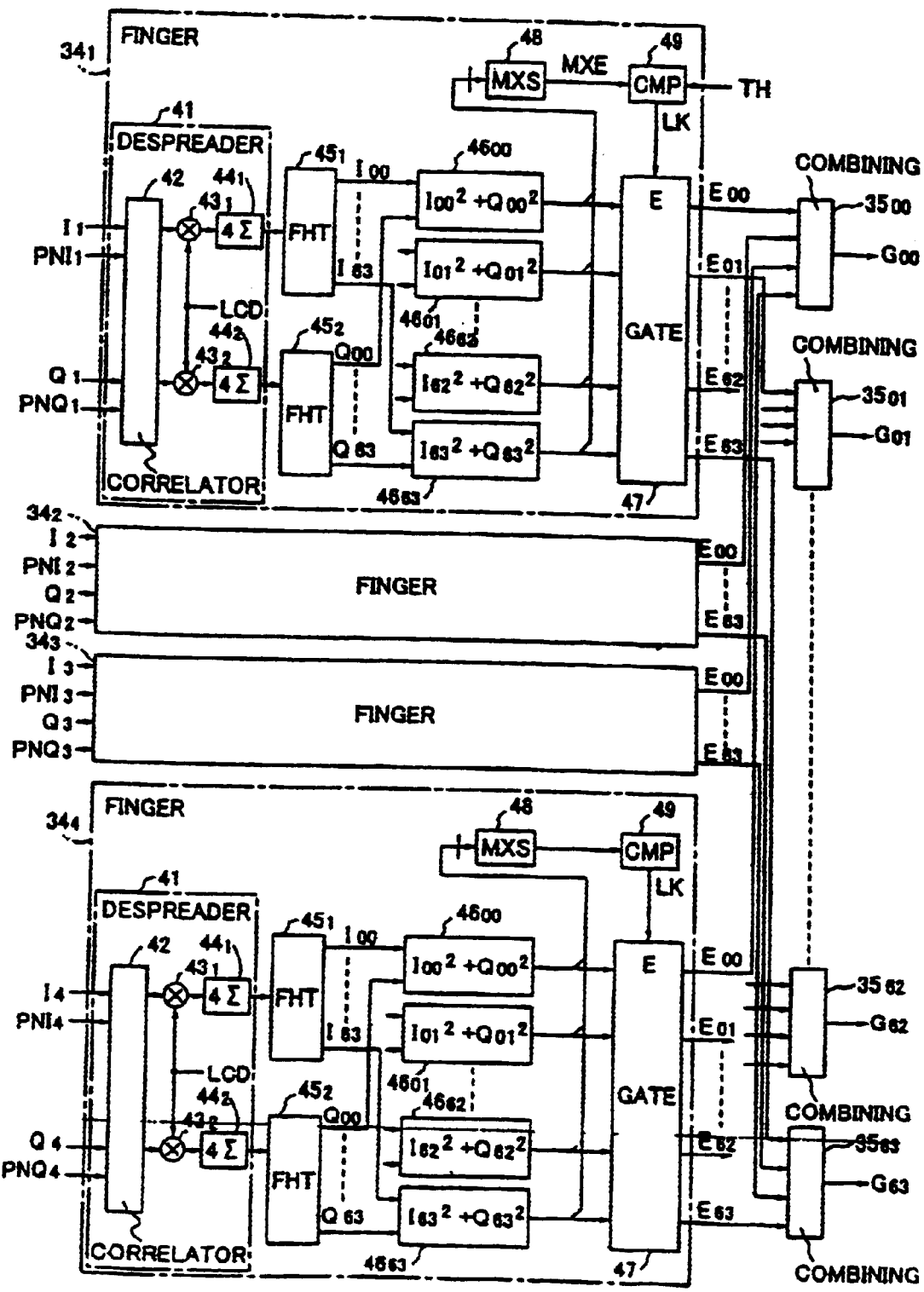
FIG. 6 is a system block diagram showing fingers forming the receiver part.
Figure 8A:
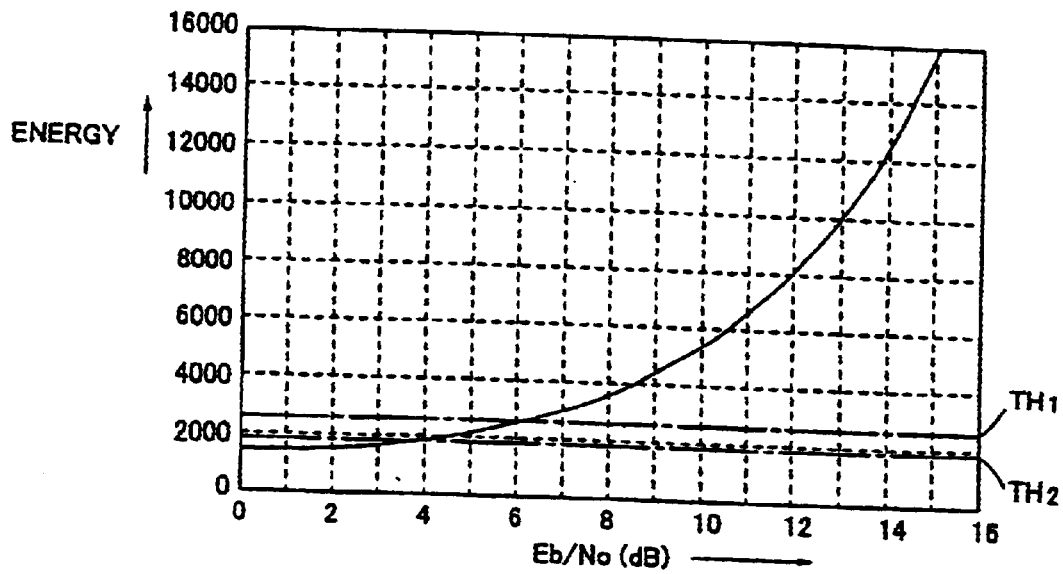
FIGS. 8A through 8C are diagrams for explaining energy characteristics of the conventional system.
Figure 8B:
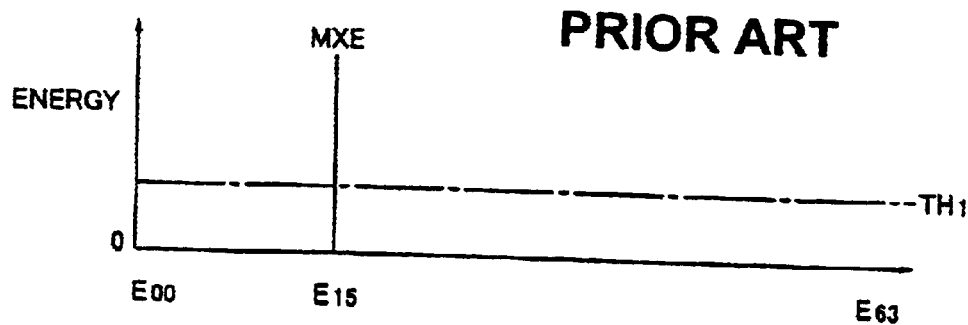
Figure 8C:
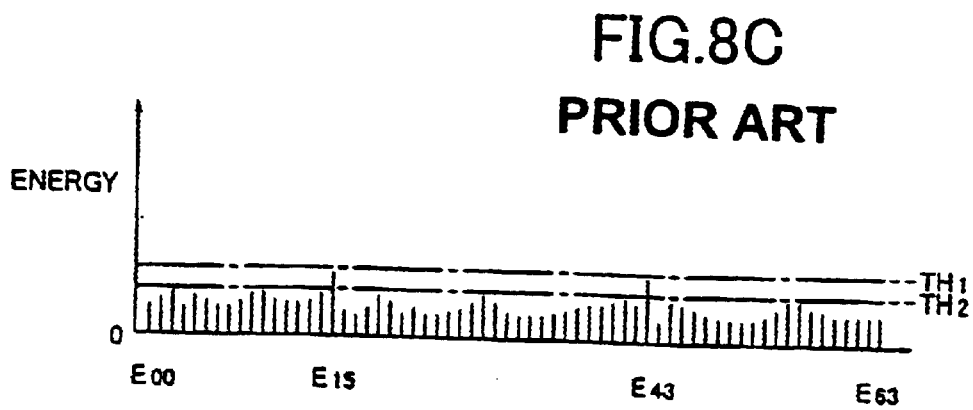

A description will be given of a first embodiment of the radio communication apparatus according to the present invention, by referring to FIGS. 10 through 13. FIG. 10 is a system block diagram showing the construction of fingers $34_1$ through $34_4$ of the first embodiment. In FIG. 10, a finger lock controller (FLC) 50 carries out a finger lock control for turning ON/OFF a gate circuit 47 based on whether an energy difference MXE−NXE between a maximum value MXE and a second largest value NXE of correlation energies $E_{00}$ through $E_{63}$ obtained in the finger $34_1$ exceeds a predetermined threshold value th. The finger lock controller 50 carries out a similar finger lock control with respect to each of the other fingers $34_2$ through $34_4$. Otherwise, the construction of the fingers $34_1$ through $34_4$ may be similar to that of the fingers described above in conjunction with FIGS. 3 and 6.

A description will be given of the effectiveness of using the energy difference for judging the finger lock, by referring to FIGS. 14 through 16. For the sake of convenience, it is assumed in the following description that Walsh codes w0 through w7 are defined by 8 bits as shown below, and that a correlation value $\lambda_{ij}$ between a received code wi and a Walsh code wj is described by $\lambda_{ij}=\{A(n)-D(N)\}/n$, where j=0, ..., 7, A(n) indicates the number of matching bits, D(N) indicates the number of non-matching bits, and n indicates the total number of bits (n=8 in this particular case).

w0="00000000"
w1="01010101"
w2="00110011"
w3="01100110"
w4="00001111"
w5="01011010"
w6="00111100"
w7="01101001"

Figure 14:
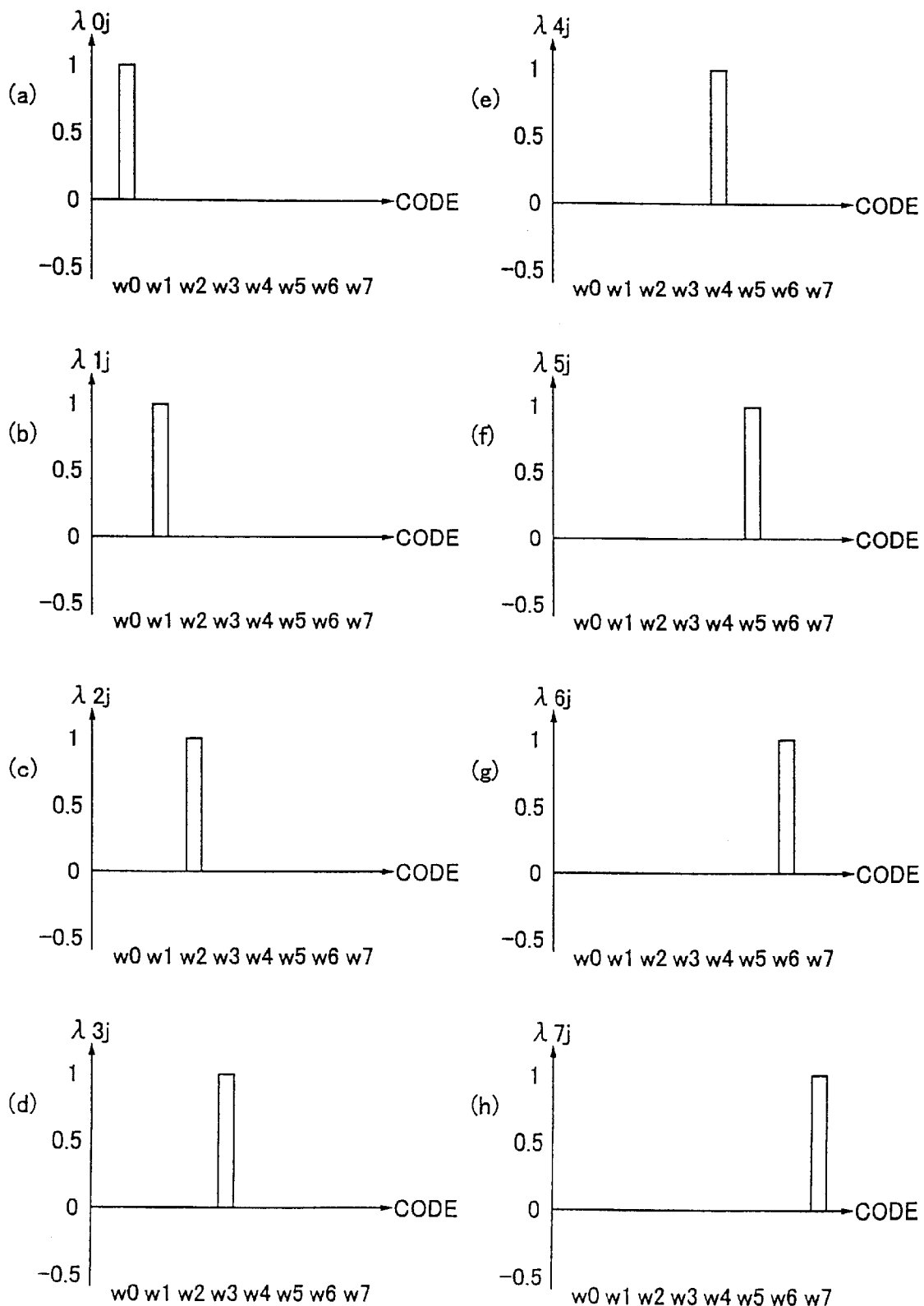
FIG. 14 (a) through (h) is a diagram for explaining correlation values in the first embodiment for a case where Eb/No is sufficiently high.

In FIG. 14, (a) through (h) respectively show cases where Eb/No (reception quality) is sufficiently high and the received code wi (=w0 through w7) are correctly received. In other words, in FIG. 14 (a), as a result of receiving wi=w0="00000000", the correlation values become $\lambda_{i0}=1$ and $\lambda_{ij}=0$, where i≠j. In addition, in FIG. 14 (b), as a result of receiving wi=w1="01010101", the correlation values become $\lambda_{i1}=1$ and $\lambda_{ij}=0$, where i≠j. In FIG. 14, (c) through (h) similarly show cases for wi=w2 through w7.

Figure 15:
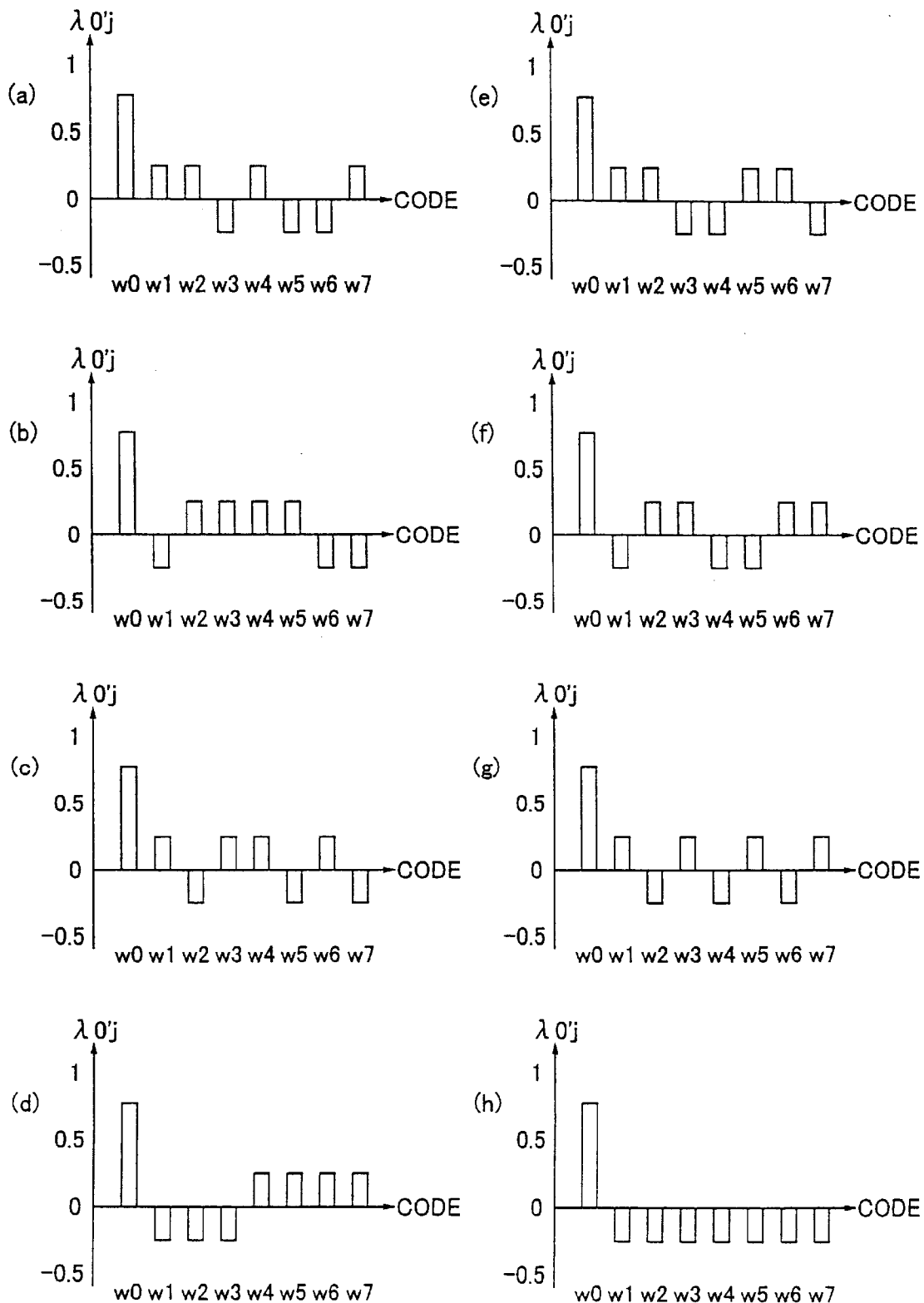
FIG. 15 (a) through (h) is a diagram for explaining correlation values in the first embodiment for a case where Eb/No is slightly lower than in FIG. 14.

In FIG. 15, (a) through (h) respectively show cases where Eb/No is slightly lower than in FIG. 14, and a 1-bit error is generated at an arbitrary position when wi=w0="00000000" is to be received. In other words, in FIG. 15 (a), as a result of receiving wi="00000001", the maximum correlation value becomes $\lambda_{i0}=0.75$ and the second largest correlation values become $\lambda_{i1}, \lambda_{i2}$, etc.=0.25. In addition, in FIG. 15 (b), as a result of receiving wi="00000010", the maximum correlation value becomes $\lambda_{i0}=0.75$ and the second largest correlation values become $\lambda_{i2}, \ldots, \lambda_{i5}=0.25$. In FIG. 15, (c) through (h) similarly show cases for wi=w2 through w7. Accordingly, even when Eb/No slightly decreases and the 1-bit error is thereby generated at the arbitrary position of the received code wi, a difference of 0.25 or greater is always obtained between the maximum value MXE and the second largest value NXE of the correlation value $\lambda_{ij}$.

Figure 16:
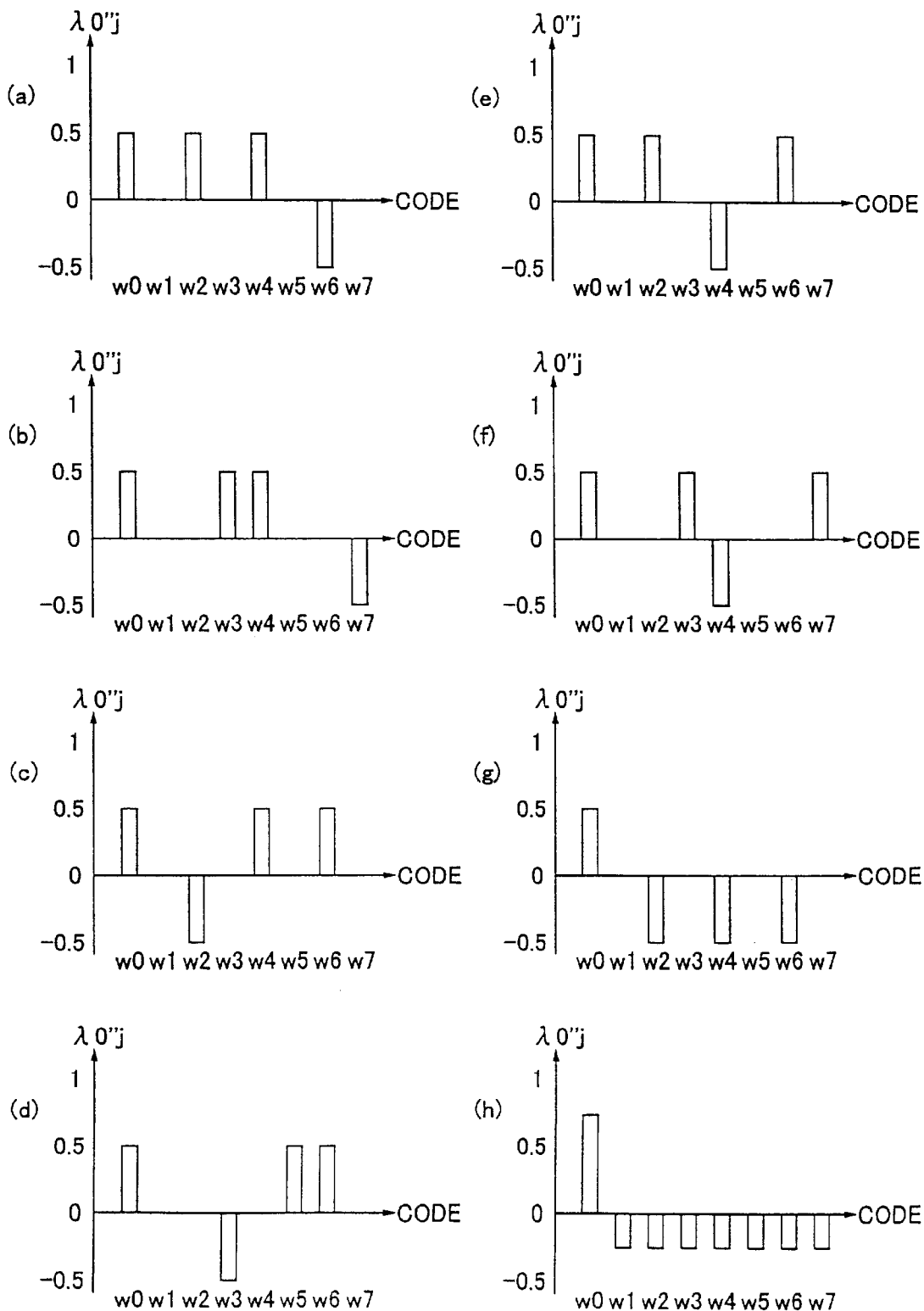
FIG. 16 (a) through (h) is a diagram for explaining correlation values in the first embodiment for a case where Eb/No is further decreased than in FIG. 15.

In FIG. 16, (a) through (h) respectively show cases where Eb/No further decreases than in FIG. 15, and a burst error of 2 bits is generated at arbitrary positions when wi=w0="00000000" is to be received. In other words, in FIG. 16 (a), as a result of receiving wi="00000011", the correlation value which should be maximum decreases to $\lambda_{i0}=0.5$ and the other correlation values become $\lambda_{i2}, \lambda_{i4}=0.5$. In addition, in FIG. 16 (b), as a result of receiving wi="00000110", the correlation value which should be maximum decreases to $\lambda_{i0}=0.5$ and the other correlation values become $\lambda_{i3}, \lambda_{i4}=0.5$. In FIG. 16, (c) through (h) similarly show cases for wi=w2 through w7, and the situation shown in FIG. 16 (h) is the same as that shown in FIG. 15 (h). Accordingly, when Eb/No decreases and the burst error of 2 bits is generated in the received code wi, it no longer becomes possible to judge which code is received.

The error generated in the received code is described above for the case where the Walsh code is made up of 8 bits, but actually, the Walsh code is made up of 64 bits. Consequently, an energy difference obtained between the maximum value MXE and the second largest value NXE of the correlation value $\lambda_{ij}$ becomes greater than a predetermined value, up to a burst error of several bits.

For example, when a 1-bit error is generated at an arbitrary position of the Walsh code wo="00000000 . . . 00000000", the correlation value $\lambda_{00}$ becomes as follows, and corresponds to the situation shown in FIG. 14.

$\lambda_{00}=(63-1)/64=62/64=0.97$

In addition, when an 8-bit error is generated at arbitrary positions of the Walsh code wo="00000000 . . . 00000000", the correlation value $\lambda_{00}$ becomes as follows, and corresponds to the situation shown in FIG. 15.

$\lambda_{00}=(56-8)/64=48/64=0.75$

Further, when a 16-bit error is generated at arbitrary positions of the Walsh code wo="00000000 . . . 00000000", the correlation value $\lambda_{00}$ becomes as follows, and corresponds to the situation shown in FIG. 16.

$\lambda_{00}=(48-16)/64=32/64=0.5$

Accordingly, it is actually possible to accurately judge the maximum value MXE and the second largest value NXE of the correlation energy $E_{ij}$ for up to a burst error on the order of 8 bits. Moreover, the correlation energy difference accurately reflects Eb/No (reception quality) at the finger, regardless of the magnitude of the absolute values of the correlation energies. Hence, it is effective to utilize the energy difference MXE–NXXE for the judgement of the locking and unlocking of the finger output.

Figure 10:
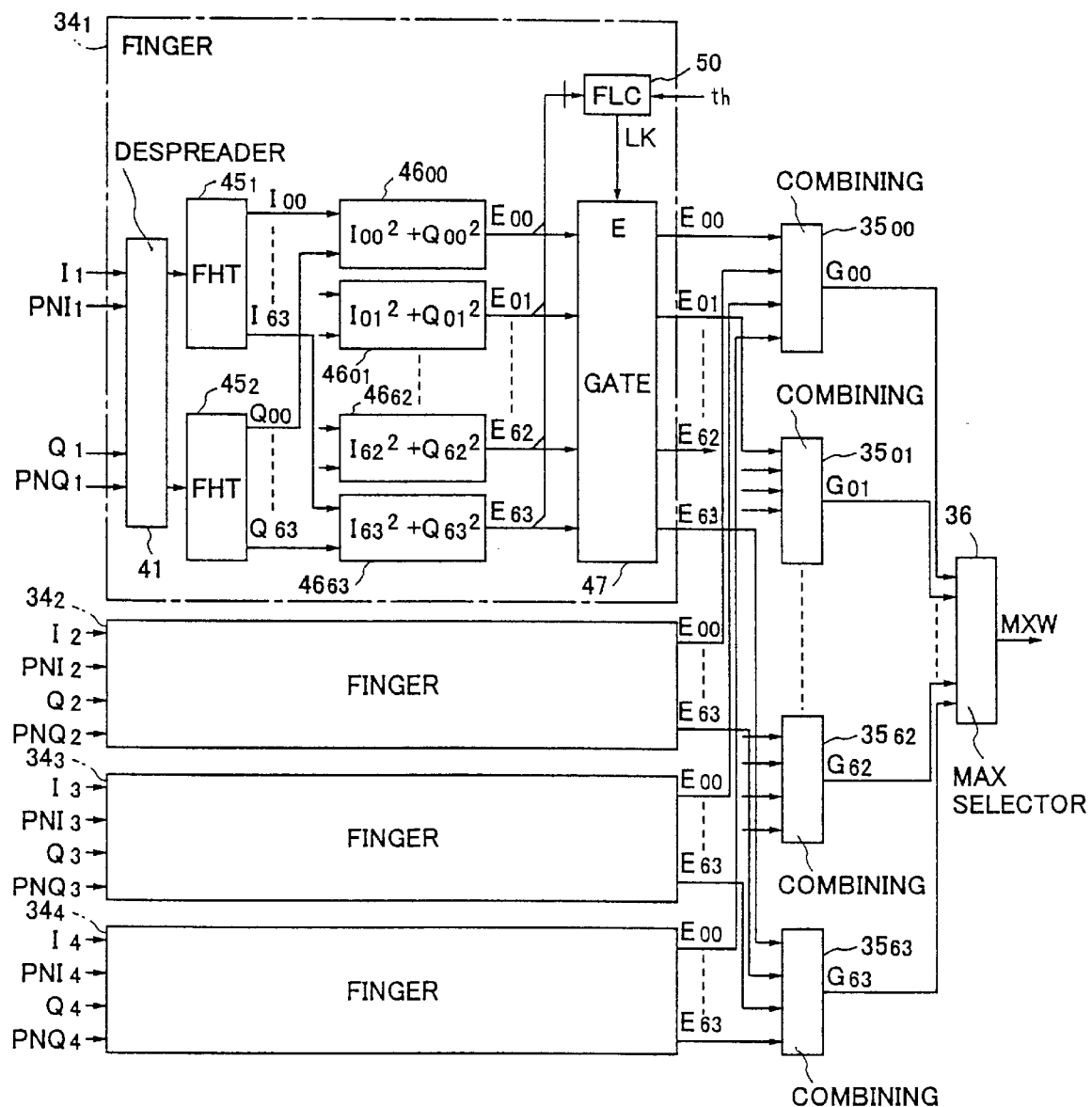
FIG. 10 is a system block diagram showing the construction of fingers of a first embodiment of the radio communication apparatus according to the present invention.
Figure 11:
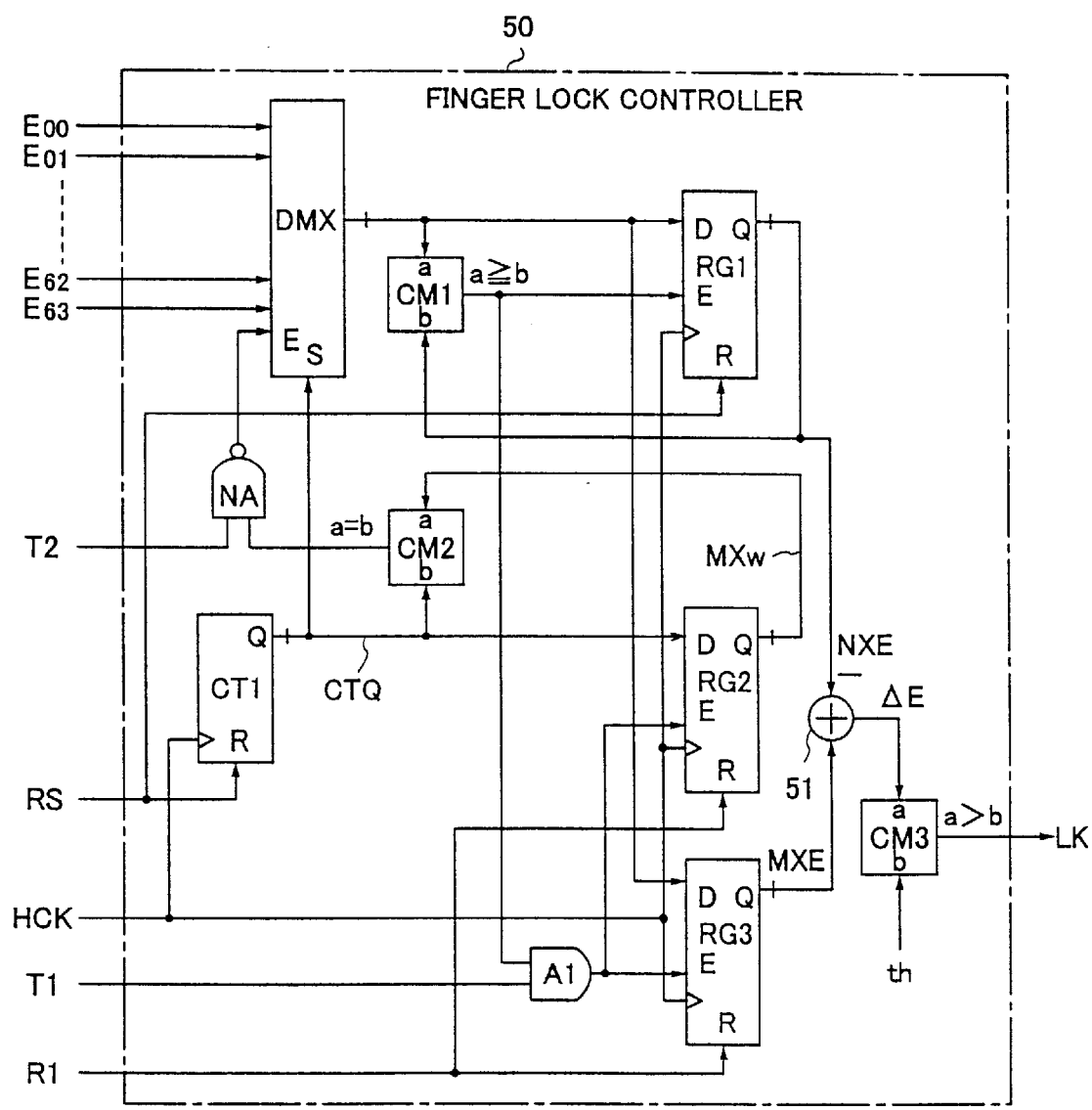
FIG. 11 is a system block diagram showing a construction of a finger lock controller of the first embodiment.
Figure 12:
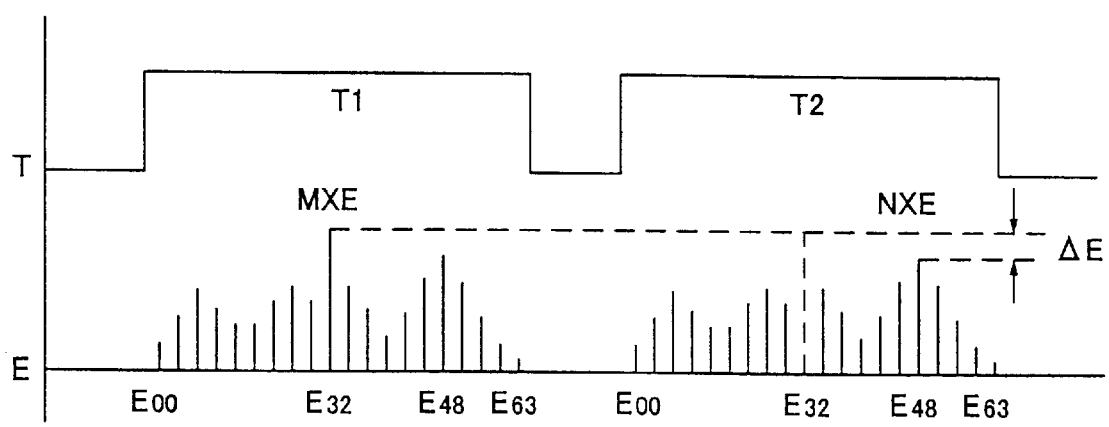
FIG. 12 is a timing chart for explaining the operation of the finger lock controller shown in FIG. 11.

FIGS. 11 and 12 are diagrams for explaining the finger lock controller 50 shown in FIG. 10. More particularly, FIG. 11 is a system block diagram showing a construction of the finger lock controller 50 which employs a serial operation system requiring a small circuit scale, and FIG. 12 is a timing chart for explaining the operation of the finger lock controller 50 shown in FIG. 11.

During a time interval T1 shown in FIG. 12, a counter CT1 shown in FIG. 11 counts up from 0 to 63 responsive to a high-speed clock HCK, and a data multiplexer DMX consequently scans the input correlation energies $E_{00}$ through $E_{63}$. A comparator CM1 compares an output a of the data multiplexer DMX and an output b of a maximum value storage register RG1, and outputs a signal (a≧b)=1 if a≧b. Hence, the registers RG1 and RG3 store the output energy of the data multiplexer DMX at this point in time, and a register RG2 stores a counted value CTQ of the counter CT1 at this point in time. Hence, when the counted value CTQ of the counter CT1 reaches 63, the registers RG1 and RG3 store the maximum value MXE of the correlation energies $E_{00}$ through $E_{63}$, and the register RG2 stores a counted value (that is, Walsh code number) MXw corresponding to the maximum value MXE.

During a next time interval T2, both the register RG1 and the counter CT1 are reset, and are used again for the detection of the maximum value. In this state, however, a comparator CM2 compares the counted value CTQ (b) of the counter CT1 and the stored value MXw (a) of the register RG2, and outputs a signal (a=b)=1 if a=b. Accordingly, a NAND gate circuit NA is activated to block the output of the data multiplexer DMX, and the output of the data multiplexer DMX becomes 0, for example. In other words, during this time interval T2, the maximum energy value MXE detected during the time interval T1 is excluded from the comparison. As a result, when the counted value CTQ of the counter CT1 reaches 63, the register RG1 stores the second largest value NXE of the correlation energies $E_{00}$ through $E_{63}$.

In this state, an adder 51 obtains an energy difference ΔE between the maximum value MXE and the second largest value NXE of the correlation energy $E_{ij}$. A comparator CM3 compares the energy difference ΔE (a) and the predetermined threshold value th (b), and outputs a finger lock signal LK=1 which indicates the finger locked state if a>b. In FIG. 11, A1 denotes an AND gate circuit.

Figure 13:
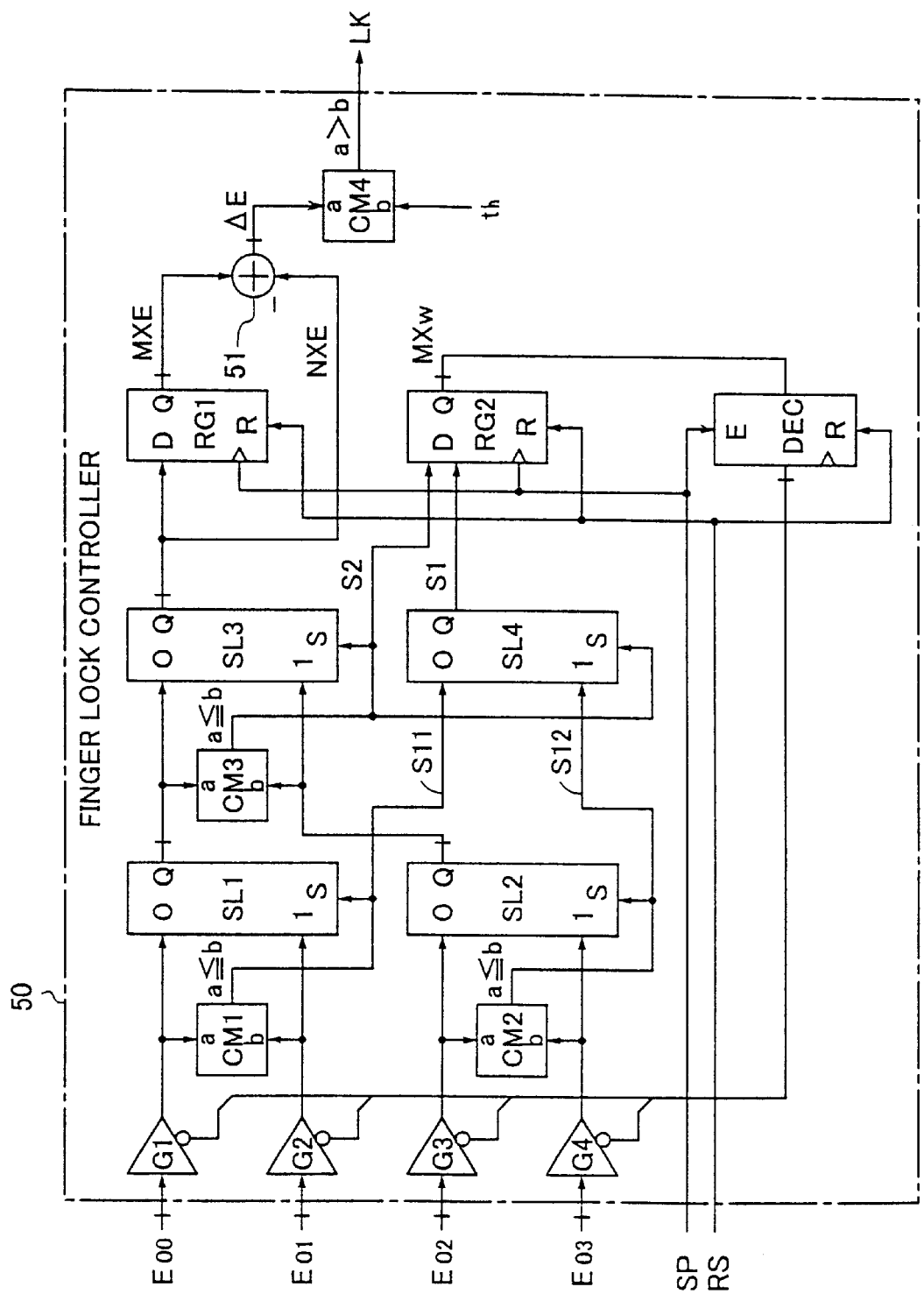
FIG. 13 is a system block diagram showing another construction of the finger lock controller.

FIG. 13 is a system block diagram showing another construction of the finger lock controller 50 which employs a parallel operation system with a high processing speed. For the sake of convenience, FIG. 13 shows a case where there are 4 input correlation energies $E_{00}$ through $E_{03}$. In FIG. 13, G1 through G4 denote gate circuits, SL1 through SL4 denote selectors, and DEC denotes a decoder.

The low-order comparator CM1 shown in FIG. 13 compares the input correlation energies $E_{00}$ (a) and $E_{01}$ (b), and outputs a signal (a≦b)=1 if a≦b. Hence, the selector SL1 selects and outputs the larger correlation energy $E_{01}$. Similarly, low-order comparator CM2 compares the input correlation energies $E_{02}$ (a) and $E_{03}$ (b), and outputs a signal (a≦b)=1 if a≦b. Hence, the selector SL2 selects and outputs the larger correlation energy $E_{03}$. In addition, the high-order comparator CM3 compares the larger correlation energy E01 (a) from the selector SL1 and the larger correlation energy E03 (b) output from the selector SL2, and outputs a signal (a≦b)=1 if a≦b. Hence, the selector SL3 selects and outputs the larger correlation energy $E_{03}$.

In this state, an output signal S2 of the comparator CM3 represents upper bits of the comparison result. S2=0 indicates that the group of input correlation energies $E_{00}$ and $E_{01}$ is larger, and S2=1 indicates that that the group of input correlation energies $E_{02}$ and $E_{03}$ is larger. In addition, the signal S2 is input to the selector SL4, and this selector SL4 selects and outputs the output signal S11 of the comparator CM1 when S2=0, and selects and outputs the output signal S12 of the comparator CM2 when S2=1.

Therefore, when the correlation energy $E_{03}$ is the largest, the signals S1 and S2 become S1=1 and S2=1 to indicate that a port 3 is the input port of the largest correlation energy $E_{03}$. Similarly, when the correlation energy $E_{02}$ is the largest, the signals S1 and S2 become S1=0 and S2=1 to indicate that a port 2 is the input port of the largest correlation energy $E_{02}$. When the correlation energy $E_{01}$ is the largest, the signals S1 and S2 become S1=1 and S2=0 to indicate that a port 1 is the input port of the largest correlation energy $E_{01}$. Further, when the correlation energy $E_{00}$ is the largest, the signals S1 and S2 become S1=0 and S2=0 to indicate that a port 0 is the input port of the largest correlation energy $E_{00}$.

At the timing when the first comparison described above is completed, a pulse signal SP is generated. Responsive to this pulse signal SP, the register RG1 stores the maximum value MXE (=$E_{03}$) of the correlation energies $E_{00}$ through $E_{03}$, and the register RG2 stores the port number (Walsh code number) MXw corresponding to the maximum value MXE. In addition, the decoder DEC is activated by the pulse signal SP, and the decoder DEC sets a gate signal to "1" on a line corresponding to the port number MXw. Thus, in the next comparison, the gate circuit G4 which corresponds to the previous maximum value MXE (=$E_{03}$) is deactivated. In other words, in this next comparison, the previously detected maximum value MXE (=$E_{03}$) is excluded from the comparison, and the second largest value NXE (for example, $E_{01}$) is detected by the comparison.

In this state, the adder 51 obtains the energy difference ΔE between the maximum value MXE and the second largest value NXE of the correlation energy $E_{ij}$. A comparator CM4 compares the energy difference ΔE (a) and the predetermined threshold value th (b), and outputs a finger lock signal LK=1 which indicates the finger locked state if a>b.

Therefore, since this first embodiment uses the energy difference ΔE between the maximum value MXE and the second largest value NXE of the correlation energy $E_{ij}$ for the comparison, it is sufficient for the energy difference ΔE to indicate that a difference greater than a predetermined value exists between the maximum value MXE and the second largest value NXE, and a difference which is greater may be clipped or clamped. For this reason, it is possible to greatly reduce the number of bits required in the comparators CM3 and CM4.

Figure 17:
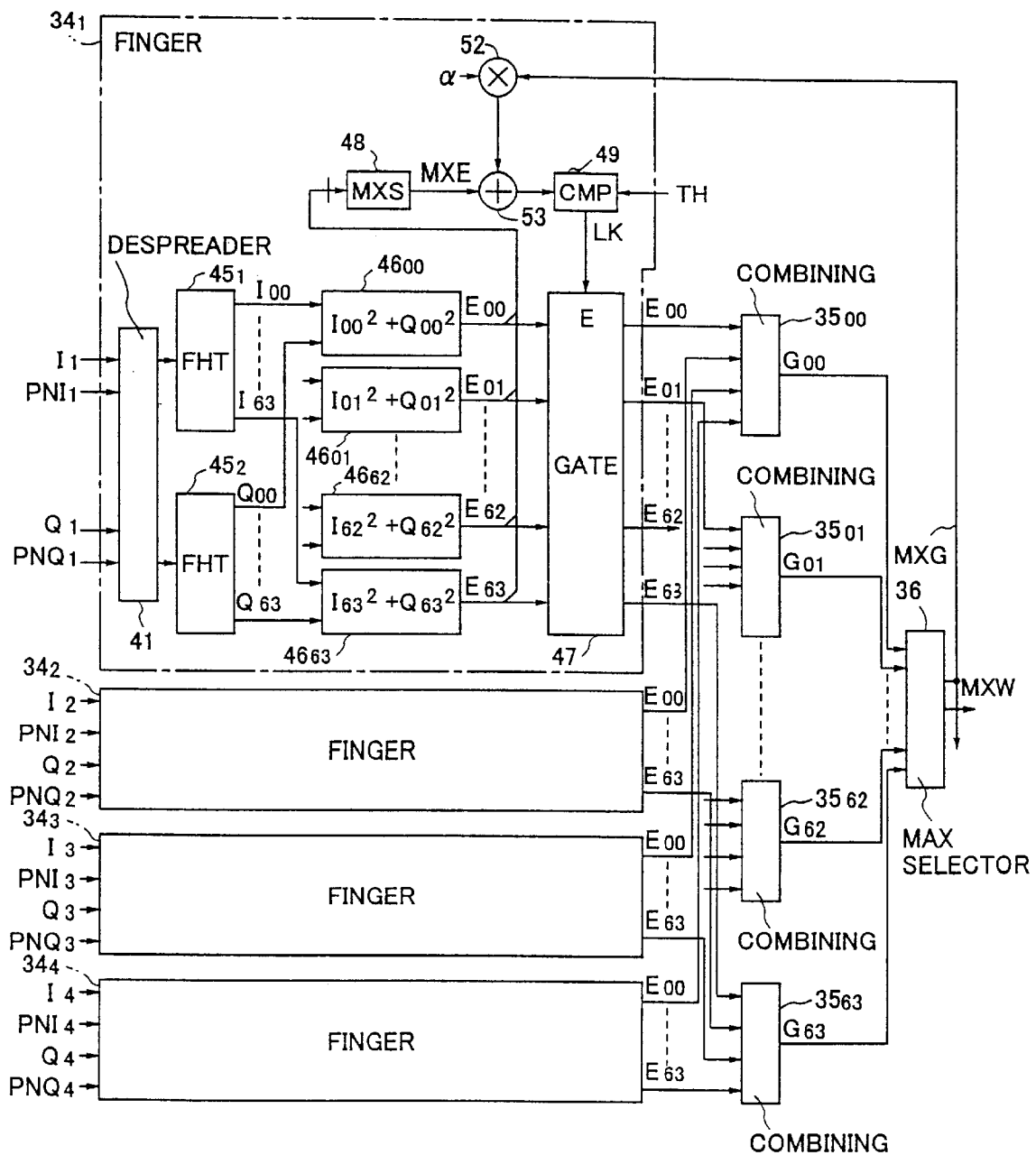
FIG. 17 is a system block diagram showing a second embodiment of the radio communication apparatus according to the present invention.

Next, a description will be given of a second embodiment of the radio communication apparatus according to the present invention, by referring to FIGS. 17 and 18. In this second embodiment, a maximum value MXG of the correlation energy obtained after combining the fingers is added with respect to a maximum value MXE of the correlation energies of the fingers, when detecting the finger locked state. FIG. 17 is a system block diagram showing the second embodiment of the radio communication apparatus.

Figure 18:
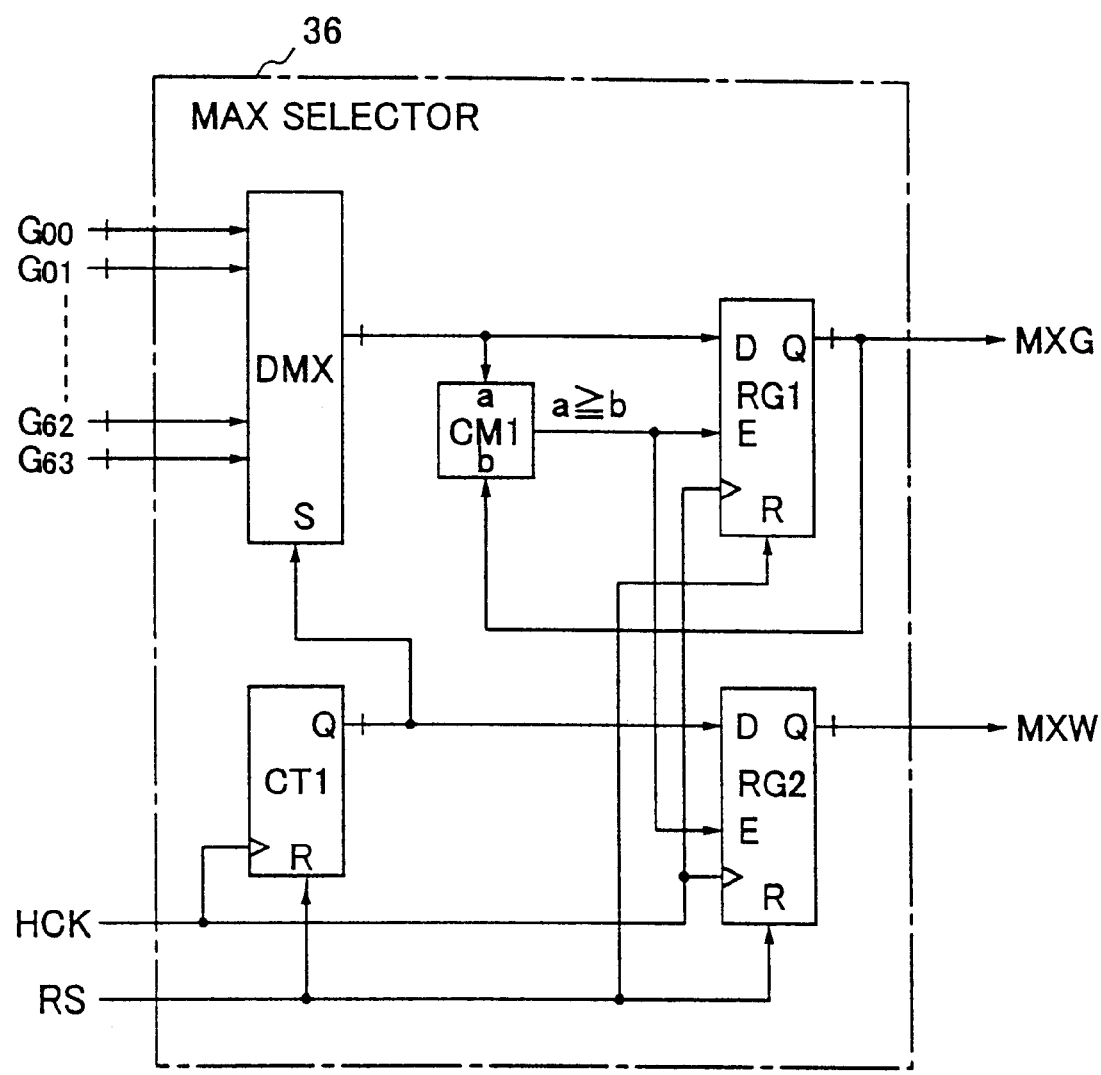
FIG. 18 is a system block diagram showing a construction of a maximum value selector of the second embodiment.

FIG. 18 is a system block diagram showing a construction of a maximum value detector 36 of the second embodiment shown in FIG. 17. In FIG. 18, the counter CT1 counts up from 0 to 63 in response to the high-speed clock HCK, and the data multiplexer DMX makes a high-speed scan of combined energies $G_{00}$ through $G_{63}$ output from the finger combining units $35_{00}$ through $35_{63}$ shown in FIG. 17. The comparator CM1 compares the output (a) of the data multiplexer DMX and the output (b) of the maximum value storing register RG1, and outputs a signal (a≧b)=1 if a≧b. Accordingly, the register RG1 stores the output energy value of the data multiplexer DMX at this point in time, and the register RG2 stores the output counted value of the counter CT1 at this point in time. When the counted value of the counter CT1 reaches 63, the register RG1 stores the maximum value MXG of the combined energies $G_{00}$ through $G_{63}$, and the register RG2 stores a counted value (Walsh code number) MXW corresponding to the maximum value MXG. Of course, the maximum value selector 36 may be constructed to employ the parallel operation system as shown in FIG. 13 described above.

Returning now to the description of FIG. 17, the maximum value MXG of the correlation energies obtained after combining the fingers, which is detected by the maximum value selector 36, is fed back to the fingers $34_1$ through $34_4$. The finger $34_1$ includes a multiplier 52 and an adder 53. Otherwise, the construction of the finger $34_1$ is the same as that of the finger $34_1$ described above in conjunction with FIG. 6.

In other words, in this second embodiment, the multiplier 52 multiplies a predetermined coefficient α (for example, 0<α≦1) to the maximum value MXG of the correlation energies obtained after combining the fingers. The adder 53 adds an output of this multiplier 52 and the maximum value MXE of the correlation energies detected by the finger $34_1$, and the comparator 49 compares an output of this adder 53 and the threshold value TH. Similar operations are carried out in relation to the other fingers $34_2$ through $34_4$. Hence, with regard to the finger lock detection, each finger in this second embodiment can effectively detect and maintain the finger locked state, even when the correlation energies of each finger decrease.

Figure 19:
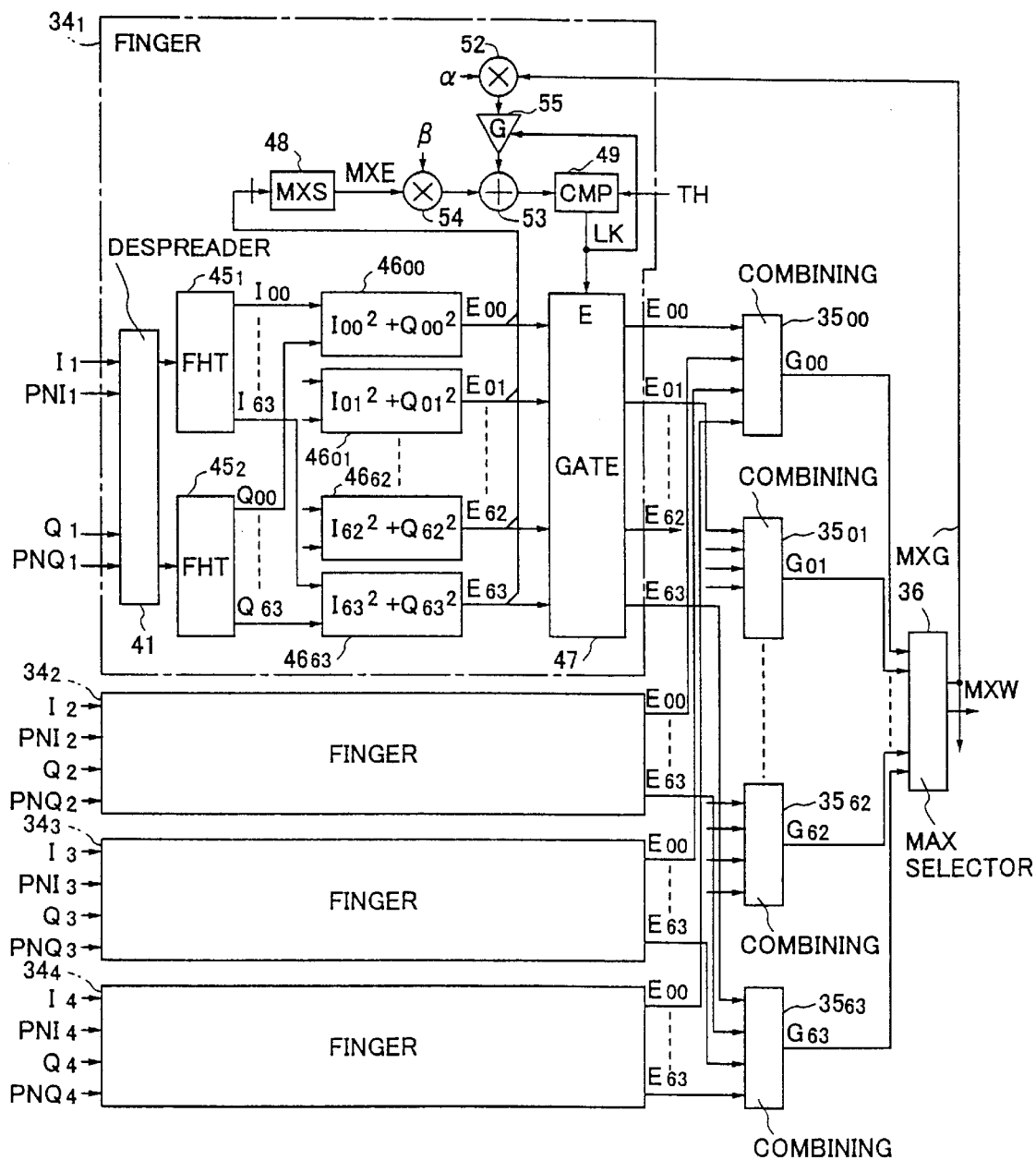
FIG. 19 is a system block diagram showing a modification of the second embodiment of the radio communication apparatus.

FIG. 19 is a system block diagram showing a modification of the second embodiment of the radio communication apparatus. FIG. 19 shows a case where the maximum value MXG of the correlation energies obtained after combining the fingers is added at a predetermined ratio only with respect to a finger which detects the finger locked state, that is, contributes to the combining of the fingers. As shown in FIG. 19, the maximum value MXG of the correlation energies obtained after combining the fingers, which is detected by the maximum value selector 36, is fed back to the fingers $34_1$ through $34_4$.

In the finger $34_1$, when the lock detection signal LK is LK=0, a gate circuit 55 is closed, so that the maximum value MXG of the correlation energies obtained after combining the fingers is not added to the maximum value MXE of the correlation energies of the finger $34_1$. The finger $34_1$ in this case must be able to assume the lock detecting state by itself. When a maximum value MXE of the correlation energies, which is valid (exceeds the threshold value TH), is detected within the finger $34_1$, the lock detection signal LK becomes LK=1, and the finger $34_1$ thereby contributes to the combining of the fingers.

It is highly possible that the maximum value MXE of the correlation energies in the finger $34_1$ is of the same energy type (Walsh code number) as the maximum value MXG of the correlation energies obtained after combining the fingers. For this reason, once the lock detection signal LK becomes LK=1, the gate circuit 55 is opened. On the other hand, a multiplier 54 multiplies a predetermined coefficient β (for example, 0<β≦1) to the maximum value MXE of the correlation energies of the finger $34_1$. Hence, the adder 53 adds an output of this multiplier 54, and the maximum value MXG of the correlation energies obtained after combining the fingers and multiplied by the predetermined coefficient α (for example, 0<α≦1) in the multiplier 52. The comparator 49 thus compares an output of this adder 53 and the threshold value TH.

Therefore, even when the correlation energies of the finger $34_1$ thereafter decreases by a certain extent, the finger $34_1$ stably contributes to the combining of the fingers. If Eb/No (communication environment) of the finger $34_1$ thereafter decreases notably and the maximum value MXE of the correlation energies thereby decreases below a predetermined value, the lock detection signal LK becomes LK=0, and the finger $34_1$ becomes excluded from the combining of the fingers. The other fingers $34_2$ through $34_4$ operate similarly to the finger $34_1$.

Therefore, according to this modification of the second embodiment, the combining of the fingers is further improved by introducing a triggering condition for the finger to assume the finger locked state by itself. The coefficients α and β may be fixed, but are preferably determined by the searcher 40 depending on the communication environment together with system parameters such as the threshold value TH.

Next, a description will be given of a third embodiment of the radio communication apparatus according to the present invention, by referring to FIGS. 20 through 24. In this third embodiment, the maximum value MXG of the correlation energies obtained after combining the fingers is added or selected on condition that the Walsh code number MXw corresponding to the maximum value MXE of the correlation energies detected by the finger matches the Walsh code number MXW corresponding to the maximum value MXG of the correlation energies obtained after combining the fingers.

Figure 20:
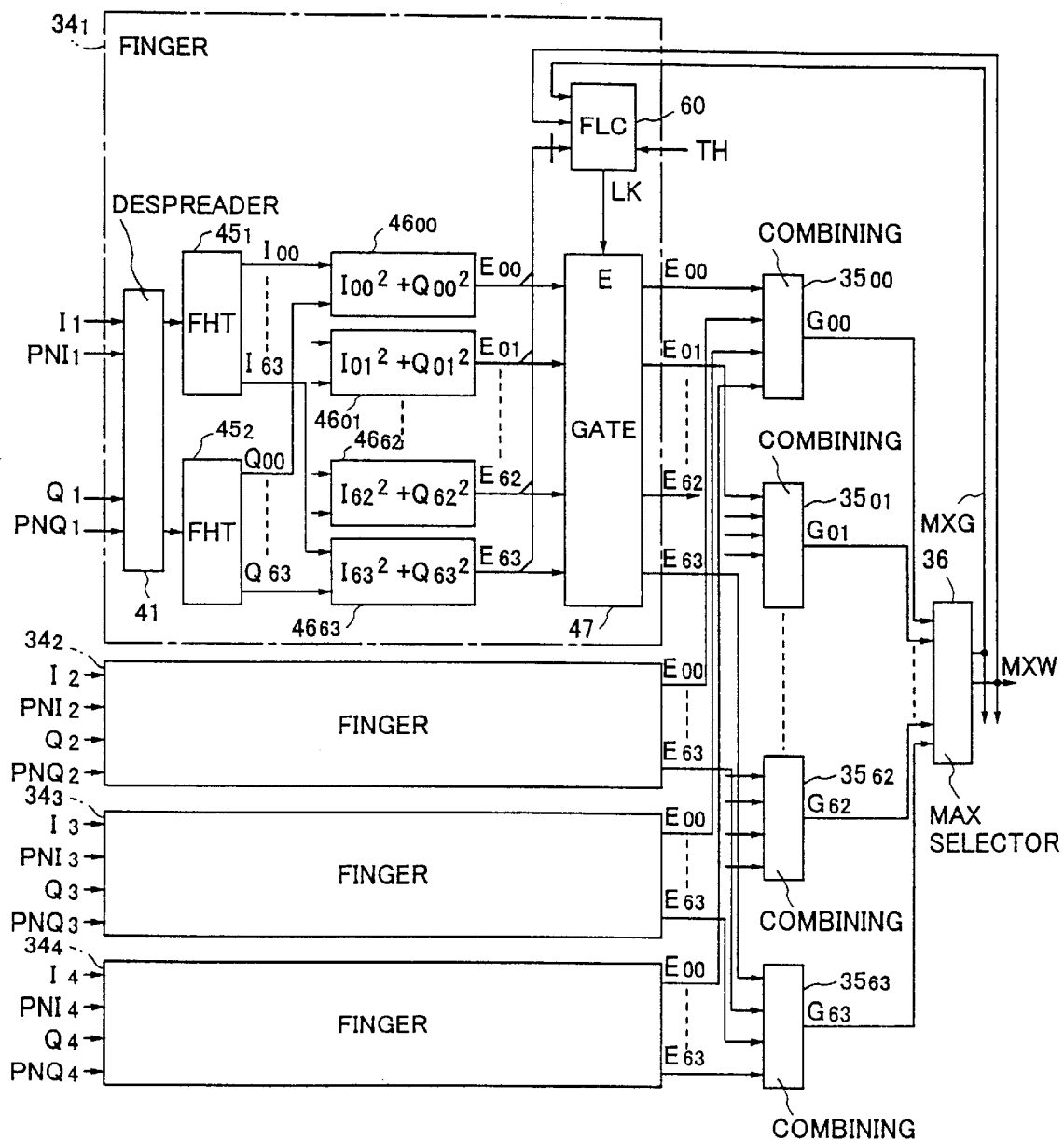
FIG. 20 is a system block diagram showing a third embodiment of the radio communication apparatus according to the present invention.

FIG. 20 is a system block diagram showing the construction of the fingers $34_1$ through $34_4$ of the third embodiment. In FIG. 20, a finger lock controller (FLC) 60 receives from the maximum value selector 36 the maximum value MXG of the correlation energies obtained after combining the fingers, and a feed back of the Walsh code number MXW corresponding to the maximum value MXG. The finger lock controller 60 carries out a control to add or select the maximum value MXG of the correlation values obtained after combining the fingers, on condition that the Walsh code number MXW matches the Walsh code number corresponding to the maximum value MXE of the correlation energies detected by the finger $34_1$. The other fingers $34_2$ through $34_4$ are constructed similarly to the finger $34_1$, and operate similarly to the finger $34_1$.

Figure 21:
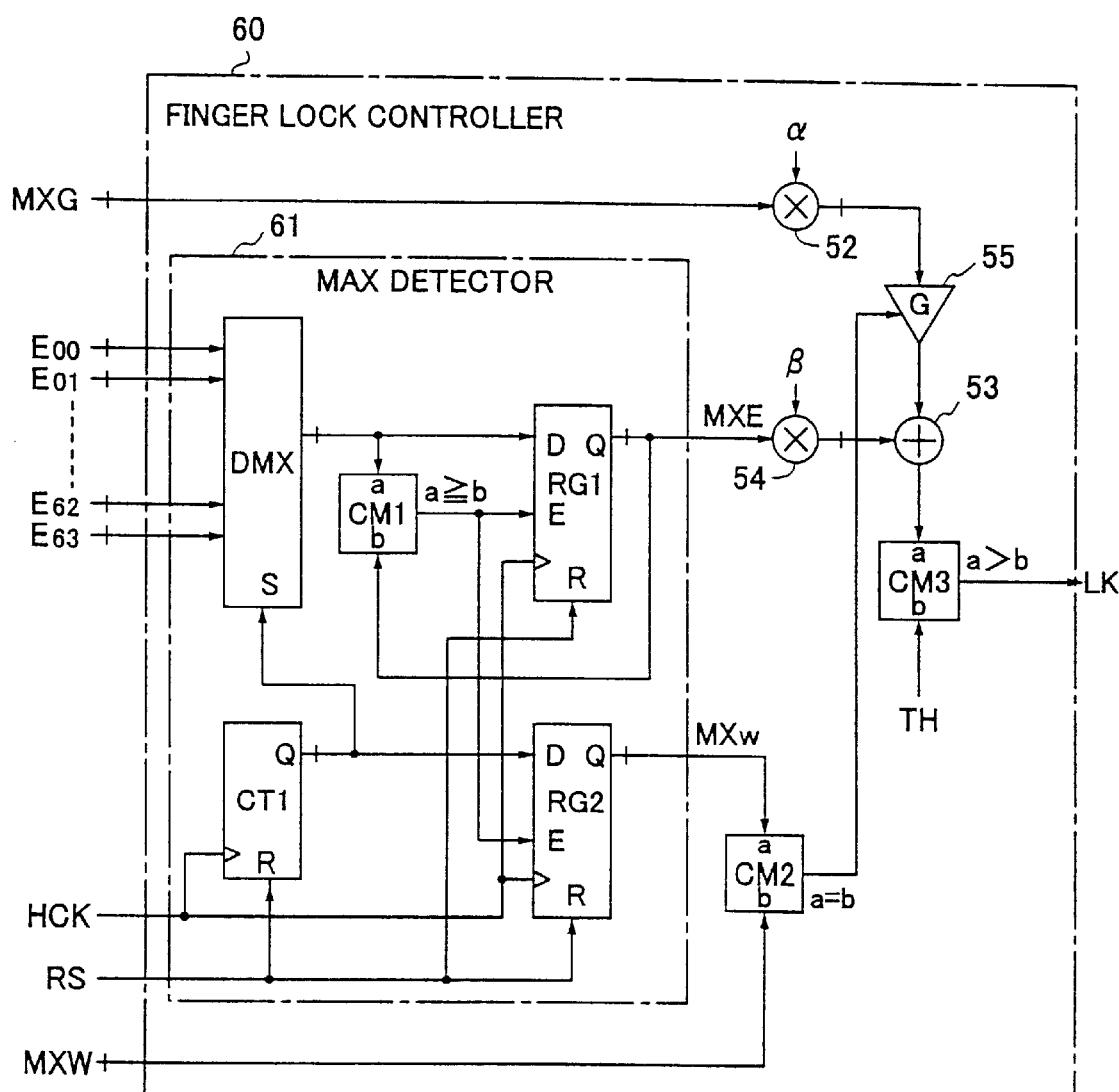
FIG. 21 is a system block diagram showing a first construction of a finger lock controller of the third embodiment.

FIG. 21 is a system block diagram showing a first construction of the finger lock controller 60. In FIG. 21, a maximum value detector 61 detects the maximum value MXE of the correlation energies $E_{00}$ through $E_{63}$ of the finger $34_1$, and the Walsh code number MXw corresponding to this maximum value MXE. The construction of the maximum value detector 61 may be the same as the maximum value detector 36 shown in FIG. 18 described above.

In FIG. 21, a gate circuit 55 is closed when the output signal (a=b) of the comparator CM2 is (a=b)=0 (a≠b), and in this state, there is no feedback (addition) of the maximum value MXG of the correlation energies obtained after combining the fingers. In addition, since the reception energy of the finger $34_1$ is low, the absolute level of the maximum value MXE of the correlation energies is also low, and as a result, a relation β MXE<TH stands for the finger $34_1$ by itself, and the lock detection signal LK is LK=0 to indicate no combining of the fingers.

Even in such a case, when the reception state of the finger $34_1$ improves, MXw=MXW is detected within the finger $34_1$ even if the absolute level of the maximum value MXE remains low. It is desirable to combine the correlation energies E00 through E63 of such finger $34_1$ in the system. In other words, the Walsh code numbers are compared, so as to obtain a criterion for judging whether or not a target finger correctly contributes to the maximum value MXG of the correlation energies obtained after combining the fingers. Even if the absolute level of the maximum value MXE of the correlation energies of the target finger is small, this criterion can be used to accurately indicate whether or not the quality of the target finger is satisfactory. Accordingly, the comparator CM2 compares the Walsh code number MXw (a) of the finger $34_1$ and the Walsh code number MXW (b) obtained after combining the fingers, and opens the gate circuit 55 if a=b. Consequently, the adder 53 adds the maximum energy component α MXG obtained after combining the fingers to the maximum energy component β MXE of the finger $34_1$, and the finger $34_1$ assumes a finger locked state. Thereafter, the lock detection level of finger $34_1$ is increased while the detection of MXw=MXW continues, and the finger $34_1$ stably contributes to the combining of the fingers.

Figure 22:
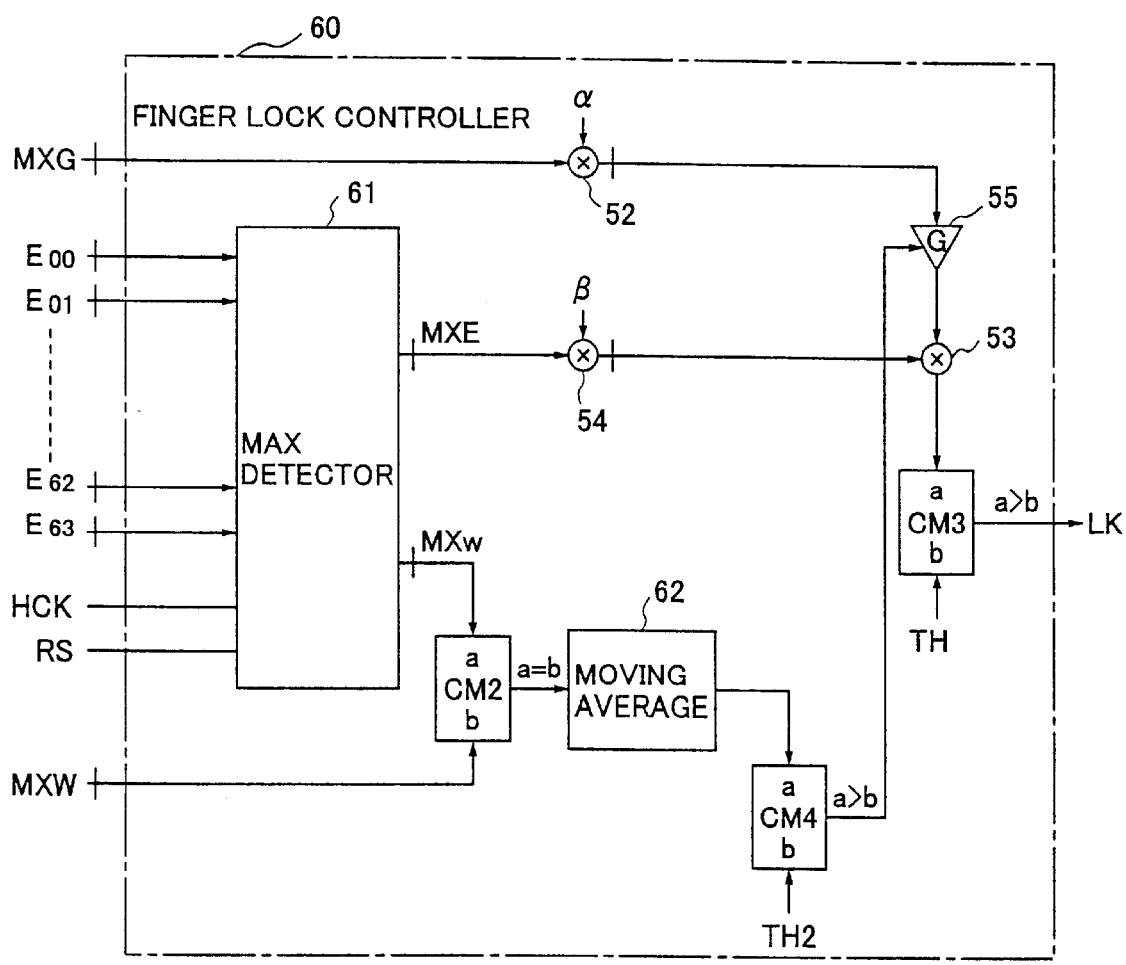
FIG. 22 is a system block diagram showing a second construction of a finger lock controller of the third embodiment.

FIG. 22 is a system block diagram showing a second construction of the finger lock controller 60. In FIG. 22, a moving average unit 62 obtains a moving average of a predetermined number of comparison results (0 or 1) of the comparator CM2 which compares the Walsh code numbers MXw and MXW. Otherwise, the construction of the finger lock controller 60 shown in FIG. 22 is the same as that of the finger lock controller 60 shown in FIG. 21. This second construction is suited for application to a transmission system (reception state) in which the noise is large. In other words, even if the comparison results MXw=MXW and MXw≠MXW are generated at random due to the effects of noise, the judgement of the reception quality made in the comparator CM4 is unaffected thereby, and it is thus possible to stably control whether or not the combining of the fingers is permissible.

Figure 23:
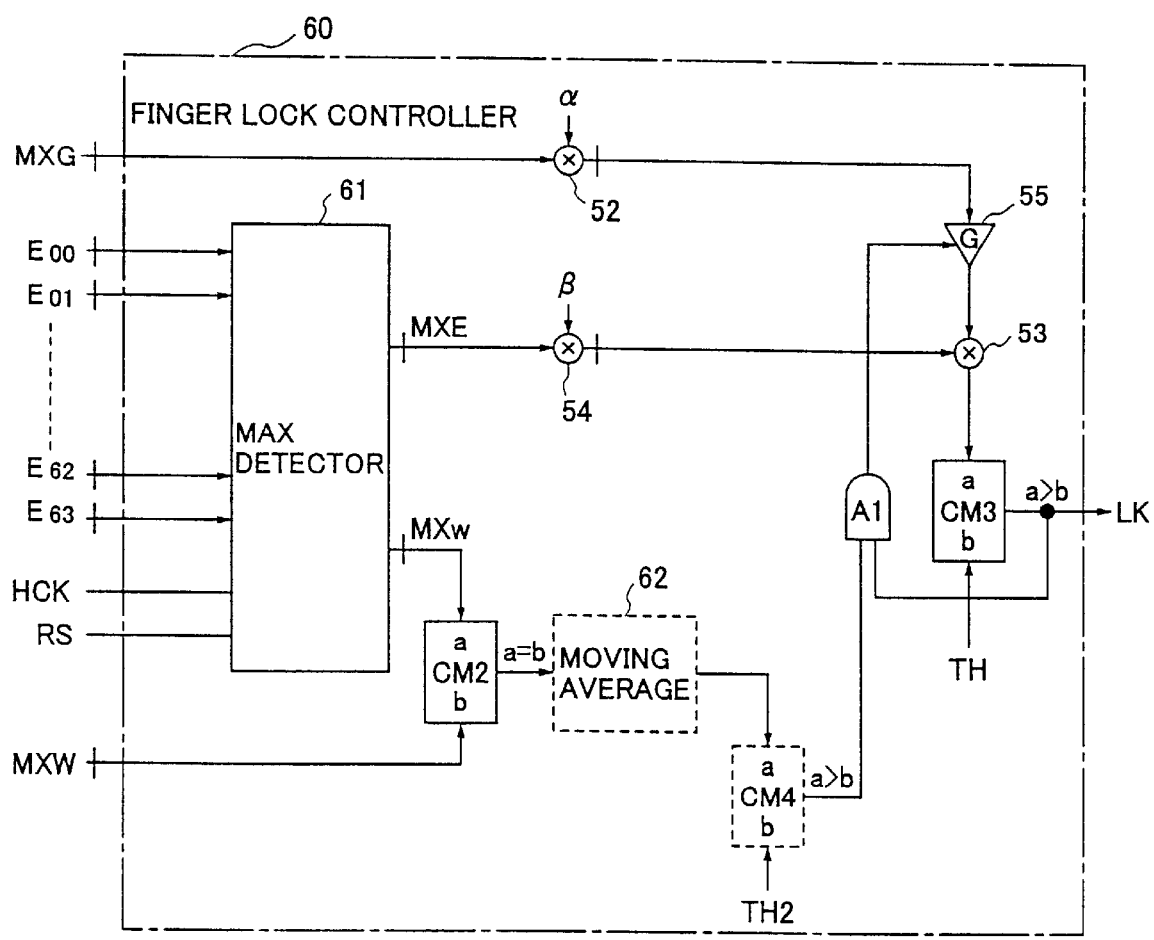
FIG. 23 is a system block diagram showing a third construction of a finger lock controller of the third embodiment.

FIG. 23 is a system block diagram showing a third construction of the finger lock controller 60. In FIG. 23, an AND gate A1 is provided, so that with respect to the construction shown in FIG. 22, a condition that the lock detection signal LK of the target finger is LK=1 is additionally included. As indicated by a phantom line in FIG. 23, the moving average unit 62 and the comparator CM4 may be omitted.

For example, when the gate circuit 55 in FIG. 23 is closed, the maximum energy component α MXG obtained after combining the fingers is not added. Initially, the finger by itself must assume a state where the lock detection signal LK is LK=1 (combining) based on the maximum energy component β MXE>TH. In other words, a case where the reception state (Eb/No) of the target finger is satisfactory and the maximum correlation energy MXE having a sufficient absolute level is detected by the target finger by itself, is used as a trigger. After the target finger assumes the finger locked state, the gate circuit 55 opens when the relation a>b (that is, the state where MXw=MXW continues) is obtained in the comparator CM4. As a result, the feedback component α MXG of the combined energy is added to the target finger, and this target finger thereafter stably contributes to the combining of the fingers.

Furthermore, when the absolute level of the maximum energy MXE at the target finger decreases and the relation a>b (state where MXw=MXW continues) is no longer satisfied in the comparator CM4, the gate circuit 55 is closed. In this case, if the absolute level of the maximum energy MXE of the target finger is less than or equal to the predetermined threshold value TH, the lock detection signal LK becomes LK=0 (no combining). Therefore, according to this third construction, a triggering condition is applied to the finger when assuming the finger locked state by itself, so as to further improve the combining of the fingers.

Figure 24:
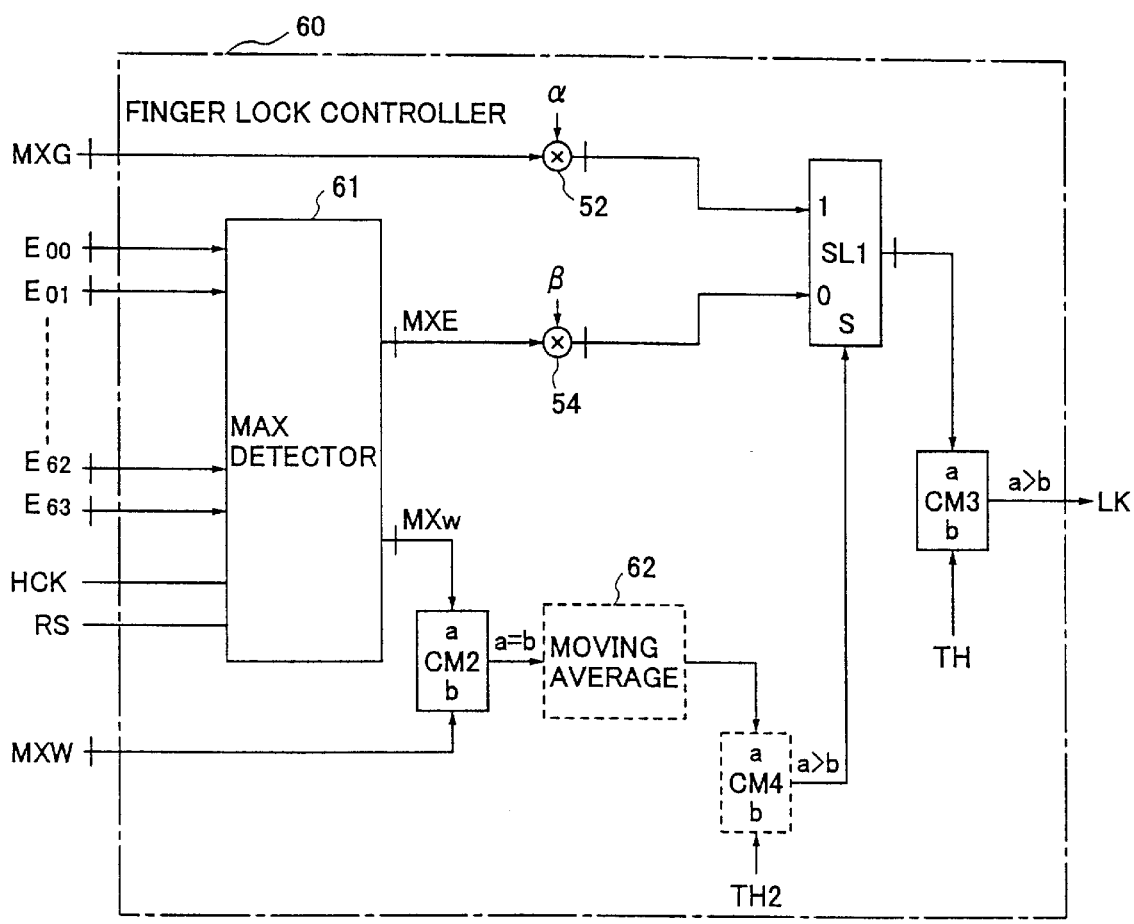
FIG. 24 is a system block diagram showing a fourth construction of a finger lock controller of the third embodiment.

FIG. 24 is a system block diagram showing a fourth construction of the finger lock controller 60. In addition to adding the maximum energy component α MXG obtained after combining the fingers as described above, this fourth construction switches between the maximum energy component β MXE of the target finger and the maximum energy component α MXG obtained after combining the fingers. The finger lock controller 60 shown in FIG. 24 includes a selector SL1. The moving average unit 62 and the comparator CM4 shown in FIG. 24 may be omitted, as indicated by a phantom line.

If a condition a>b (state where MXw=MXW continues) is not satisfied in the comparator CM4, the selector SL1 selects and outputs the maximum energy component β MXE of the target finger to which the finger lock controller 60 belongs. In this state, when maximum energy component β MXE of the target finger satisfies β MXE>TH, the lock detection signal LK becomes LK=1 (combining), and on the other hand, the lock detection signal LK becomes LK=0 (no combining) when β MXE>TH is not satisfied. In this operating mode, the control mode carries out the normal locking and unlocking depending on the magnitude of the absolute level of the maximum energy component β MXE in the target finger.

On the other hand, if the condition a>b (state where MXw=MXW continues) is satisfied in the comparator CM4, the selector SL1 selects and outputs the maximum energy component α MXG obtained after combining the fingers. In this state, when maximum energy component α MXG obtained after combining the fingers satisfies α MXG>TH, the lock detection signal LK becomes LK=1 (combining), and the lock detection signal LK becomes LK=0 (no combining) when α MXG>TH is not satisfied.

Therefore, according to this fourth construction, even in a case where the maximum energy component β MXE in the target finger is not sufficiently large for making the finger lock detection or maintaining the finger locked state, it is still possible to accurately and stably control the locking and unlocking as a result of the satisfactory reception state (state where MXw=MXW continues) of the target finger being taken into consideration. In addition, the circuit construction becomes simple because the adder 53 and the gate circuit 55 do not need to be provided. Furthermore, the parameters such as α, β and TH can be set with ease because α MXG and β MXE are directly compared with the threshold value TH.

Next, a description will be given of a fourth embodiment of the radio communication apparatus according to the present invention, by referring to FIGS. 25 through 27. When it is detected that 2 arbitrary fingers are receiving the same or approximately the same signals, this fourth embodiment unlocks the correlation value output of one of the 2 fingers, that is, disables combining of one of the 2 fingers.

Figure 25:
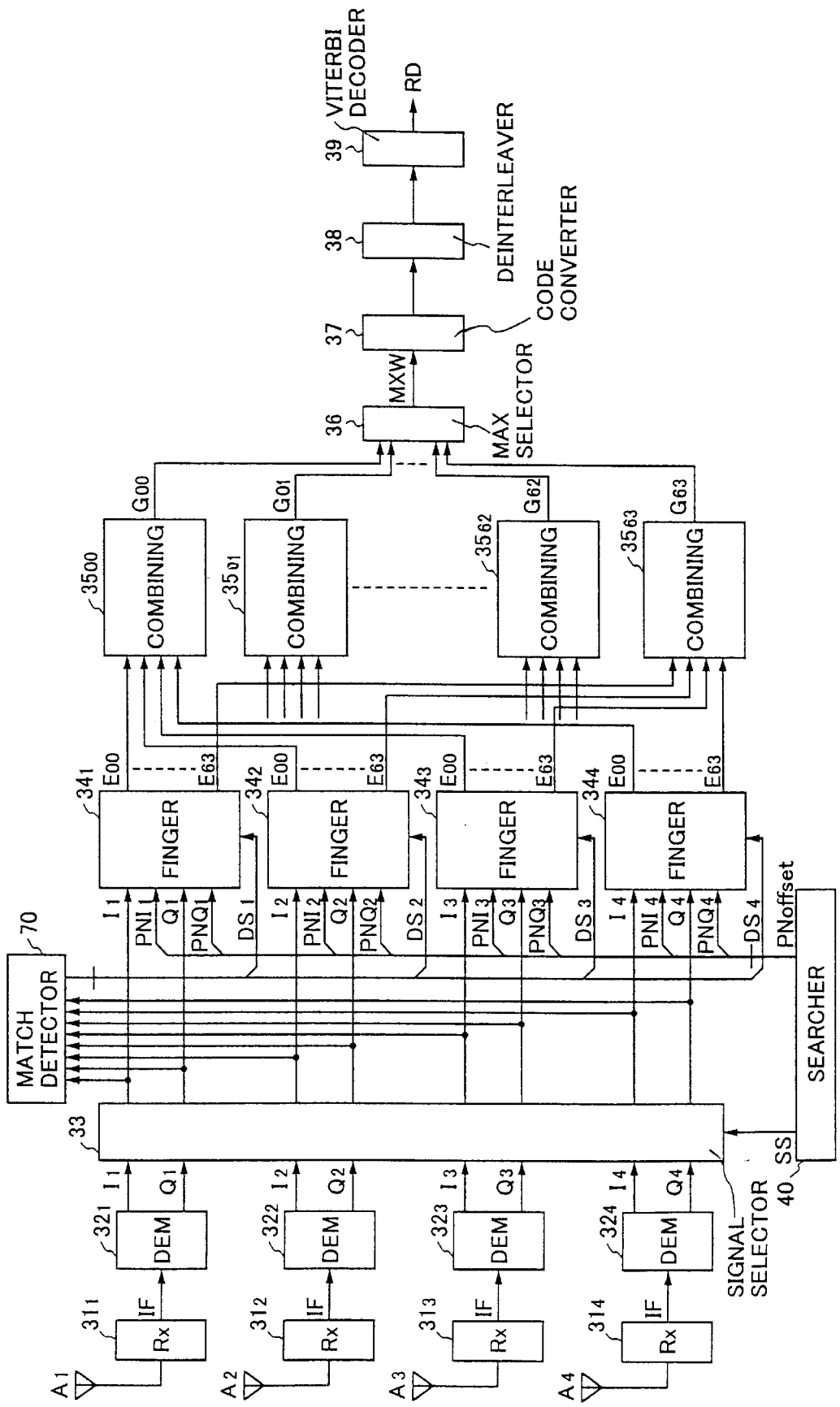
FIG. 25 is a system block diagram showing a fourth embodiment of the radio communication apparatus according to the present invention.
Figure 26:
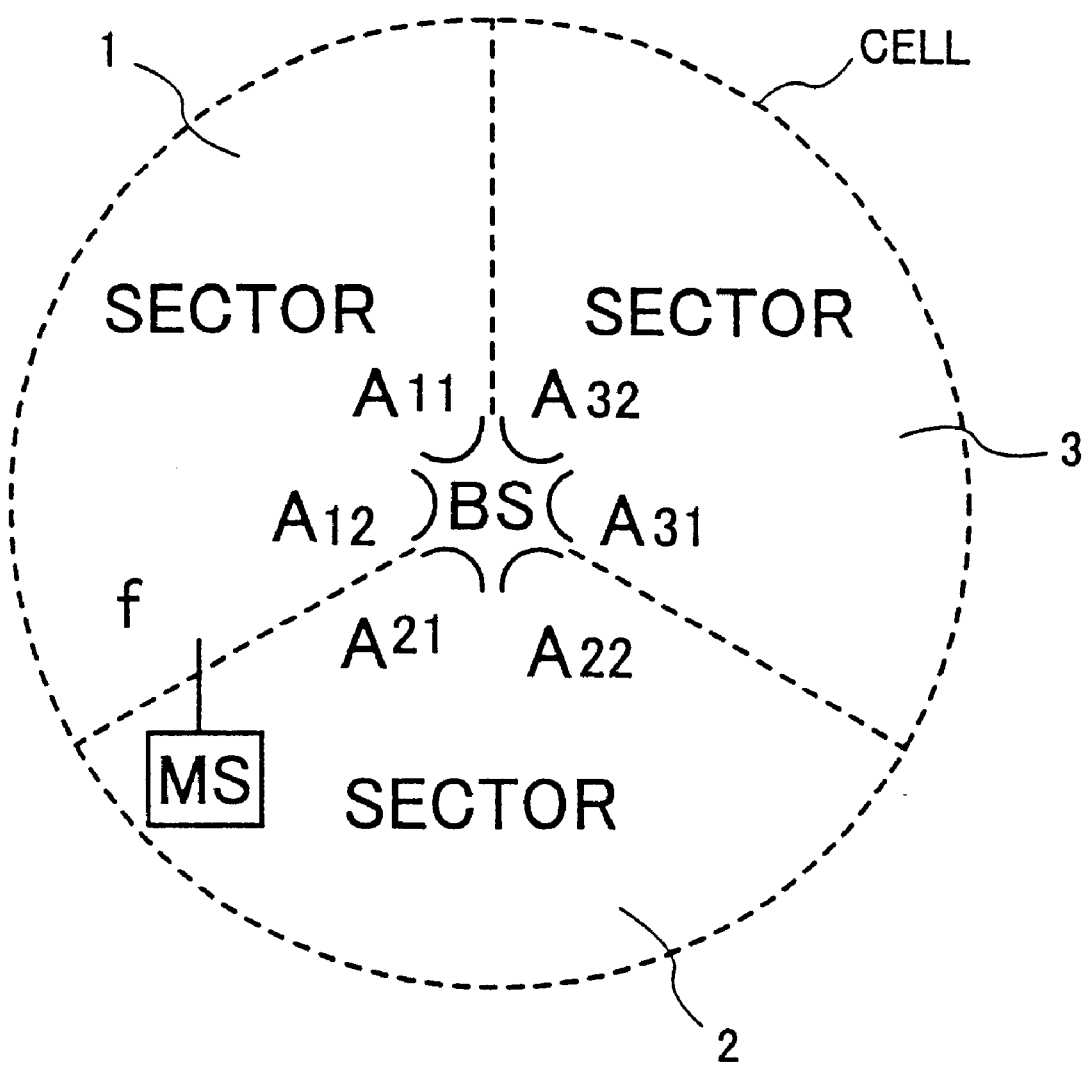
FIG. 26 is a diagram for explaining a service area of a base station of the fourth embodiment.

FIG. 25 is a system block diagram showing the fourth embodiment of the radio communication apparatus. FIG. 26 is a diagram showing a service area of the base station BS. In addition, FIG. 27 is a system block diagram showing a match detector of the fourth embodiment.

Generally, the mobile communication system arranges the fingers based on the instruction from the searcher 40. In a case where the mobile station MS is located at an approximate center between 2 adjacent antennas, such as the antennas A12 and A21 shown in FIG. 26, signals having approximately the same phase and content may be received by adjacent antennas A1 and A2 arranged by the searcher 40. However, even if the same or approximately the same signals are combined, there is virtually no gain in the RAKE reception. On the other hand, Eb/No at the base station BS is unnecessarily improved to thereby decrease the transmission output of the mobile station MS, and as a result, the Eb/No of each finger may deteriorate in the base station BS.

FIG. 25 shows the receiving system of the fourth embodiment. In FIG. 25, a match detector 70 generates finger lock disable signals DS1 through DS4 with respect to the fingers $34_1$ through $34_4$, based on a match detection related to orthogonal demodulated signals (I1, Q1) through (I4, Q4) output from the signal selector 33.

Figure 27:
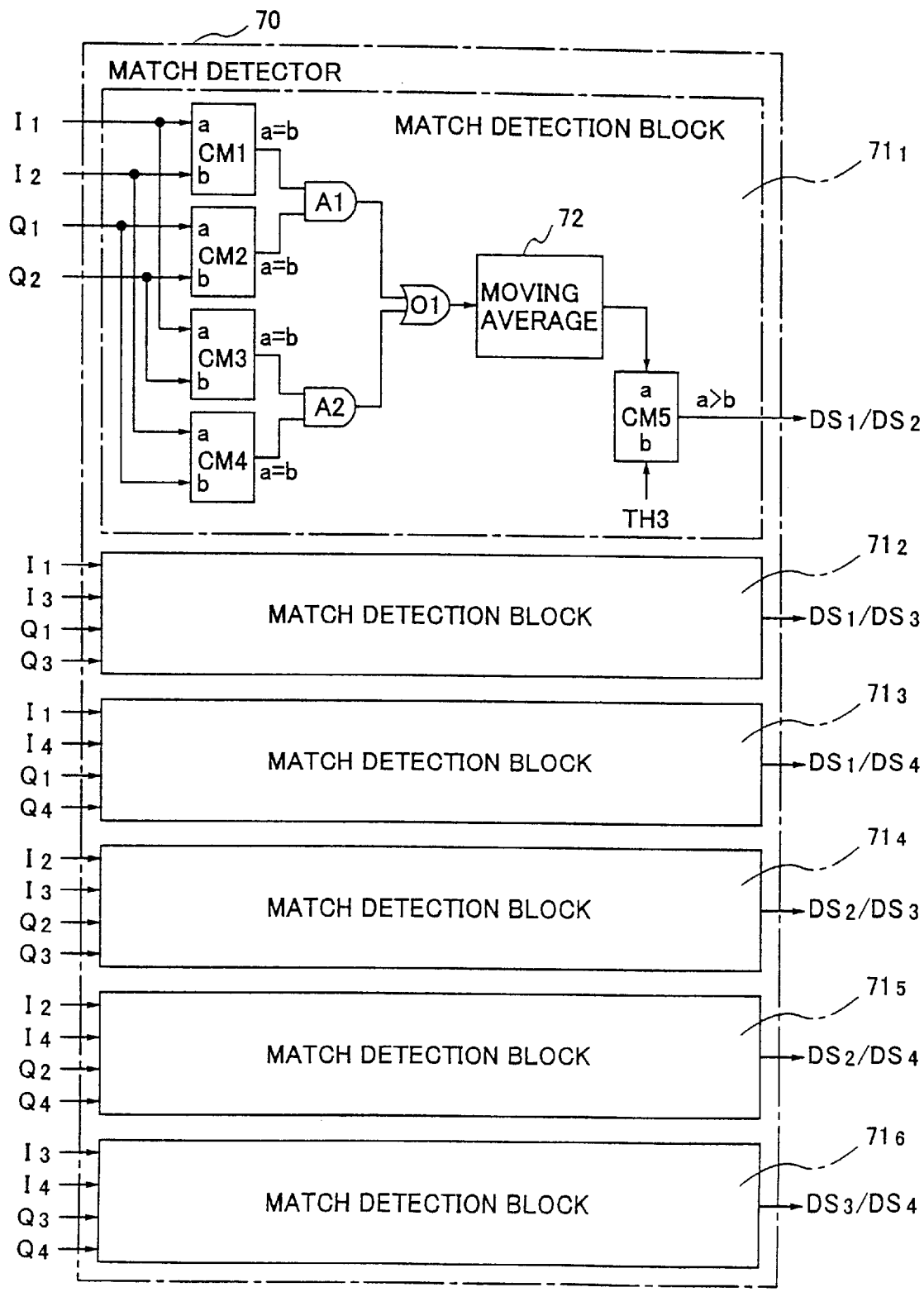
FIG. 27 is a system block diagram showing a construction of a match detector of the fourth embodiment.

FIG. 27 shows the construction of the match detector 70 of the fourth embodiment. When considering the correlation as to whether or not a pair of 2 arbitrary demodulated signals match in the 4 pairs of demodulated signals (I1, Q1) through (I4, Q4), the following 6 pair combinations are possible.

(I1, Q1)-(I2, Q2)
(I1, Q1)-(I3, Q3)
(I1, Q1)-(I4, Q4)
(I2, Q2)-(I3, Q3)
(I2, Q2)-(I4, Q4)
(I3, Q3)-(I4, Q4)

In FIG. 27, match detection blocks $71_1$ through $71_6$ respectively carry out a match detection of a corresponding one of the above 6 possible pair combinations. For example, in the math detection block $71_1$, comparators CM1 and CM2 detect a match of 2 signal pairs (I1, Q1) and (I2, Q2), that is, whether or not I1=I2 and Q1=Q2. If I1=I2 and Q1=Q2 are simultaneously satisfied, an output signal of an AND gate circuit A1 becomes "1". In addition, comparators CM3 and CM4 detect a match of 2 signal pairs (I1, Q1) and (I2, Q2), that is, whether or not I1=Q2 and I2=Q1. If I1=Q2 and I2=Q1 are simultaneously satisfied, an output signal of an AND gate circuit A2 becomes "1". The comparison by the comparators CM3 and CM4 is carried out because the phase of the radio local frequency may be shifted by π/2 by the finger. The match of the 2 signal pairs is detected when the output signal from the AND gate circuit A1 or A2 is "1".

A moving average unit 72 obtains a moving average of an output of an OR gate circuit O1 which is "1" or "0" to indicate the detection of the match or no match. A comparator CM5 compares an output (a) of the moving average unit 72 and a predetermined threshold value TH3 (b), and sets the finger lock disable signal DS1 or DS2 with respect to the corresponding finger $34_1$ or $34_2$ to DS1=1 or DS2=1 if a>b. As a result, the combining of the finger $34_1$ or $34_2$ is disabled, and unnecessary combining of the finger is prevented. Furthermore, Eb/No obtained after combining the fingers does not increase unnecessarily, and thus, the transmission power of the mobile station MS will not be decreased. The other match detection blocks $71_2$ through $71_6$ operate similarly to the match detection block $71_1$ described above.

The match detection block $71_1$ described above makes a strict match detection with respect to the 2 signal pairs (I1, Q1) and (I2, Q2). However, the match detection is not limited to such a strict match detection. Generally, large amounts of noise exist in the mobile communication system, and both the 2 signal pairs include chip error in most cases. In such cases, it is better to detect a match if the signals differ only to a certain extent, instead of making the strict match detection. For example, if a difference on the order of 1 bit exists at an arbitrary position between the 2 signals I1 and I2, the object of the present invention can be achieved even if these 2 signals I1 and I2 are regarded as being the same. In this case, it is possible to use a correlation detector (not shown) in place of the comparators CM1 through CM4. For example, if each demodulated signal has 64 bits such that

I1="00000000 . . . 00000000"

and

I2="00000000 . . . 00000001"

a correlation value $\lambda_{12}$ becomes $\lambda_{12}=(63-1)/64 \approx 0.97$, and it may be judged that the 2 signals I1 and I2 match because the correlation value $\lambda_{12}$ exceeds the predetermined threshold value TH4 which is TH4=0.95, for example.

Next, a description will be given of a fifth embodiment of the radio communication apparatus according to the present invention, by referring to FIGS. 28 and 29. When it is detected that 2 arbitrary fingers are receiving the same or approximately the same signals, this fifth embodiment unlocks the correlation value output of one of the 2 fingers, that is, disables combining of one of the 2 fingers, by means different from that used in the fourth embodiment described above.

Figure 28:
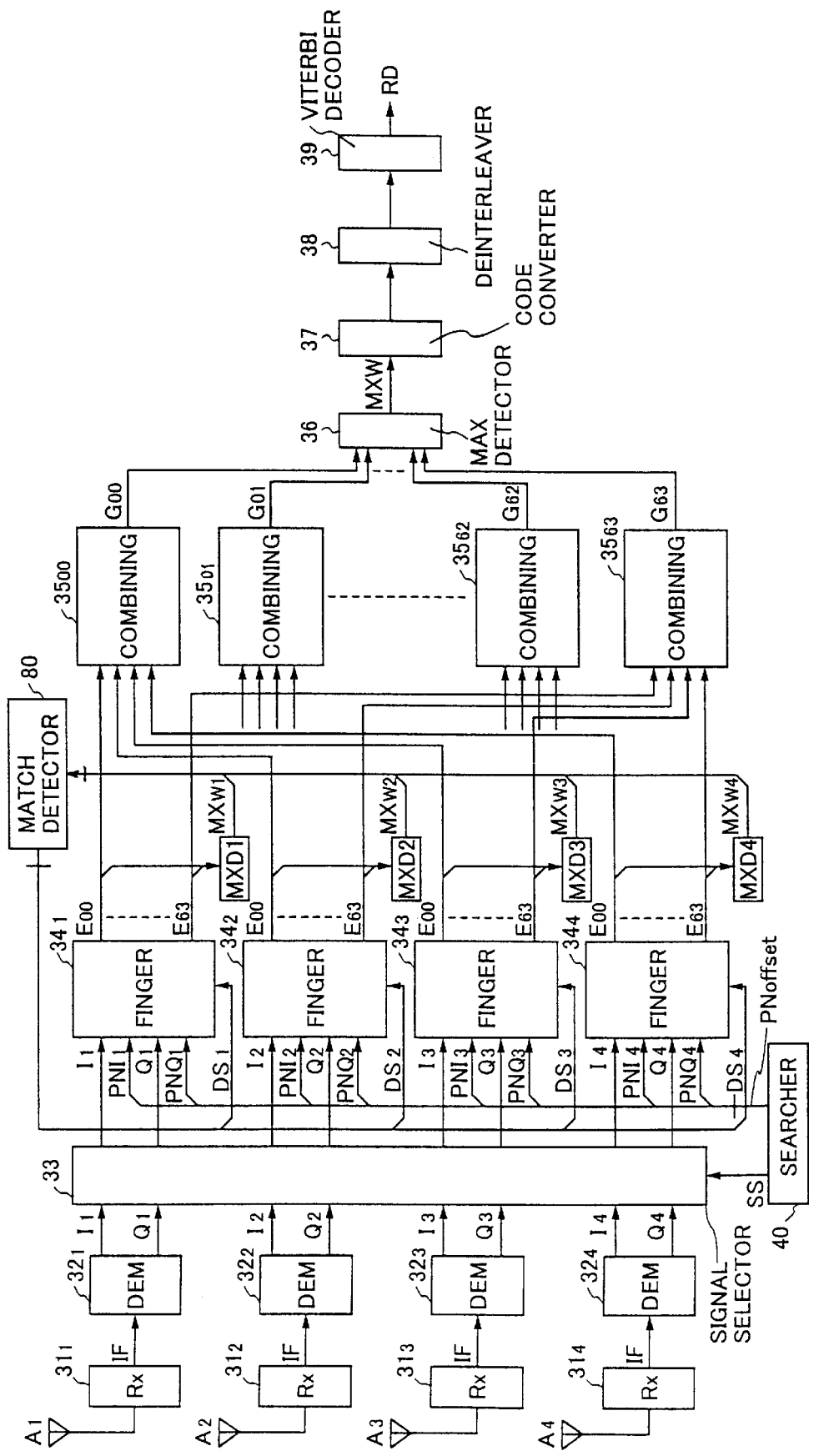
FIG. 28 is a system block diagram showing a fifth embodiment of the radio communication apparatus according to the present invention.

FIG. 28 is a system block diagram showing the fifth embodiment of the radio communication apparatus. In addition, FIG. 29 is a system block diagram showing a match detector of the fifth embodiment.

FIG. 28 shows the receiving system of the fifth embodiment. In FIG. 28, maximum code extracting units MXD1 through MXD4 extract Walsh code numbers MXw1 through MXw4 respectively corresponding to maximum values MXE1 through MXE4 of the correlation energies $E_{00}$ through $E_{63}$ of the fingers $34_1$ through $34_4$. A match detector 80 generates finger lock disable signals DS1 through DS4 with respect to the fingers $34_1$ through $34_4$, based on the match detection related to the Walsh code numbers MXw1 through MXw4 output from the maximum code extracting units MXD1 through MXD4. In this fifth embodiment, the match detection is made with respect to the Walsh code numbers MXw1 through MXw4 which are extracted by the fingers $34_1$ through $34_4$, because the signal rate is relatively low at this stage and the circuit scale can thus be made small.

Figure 29:
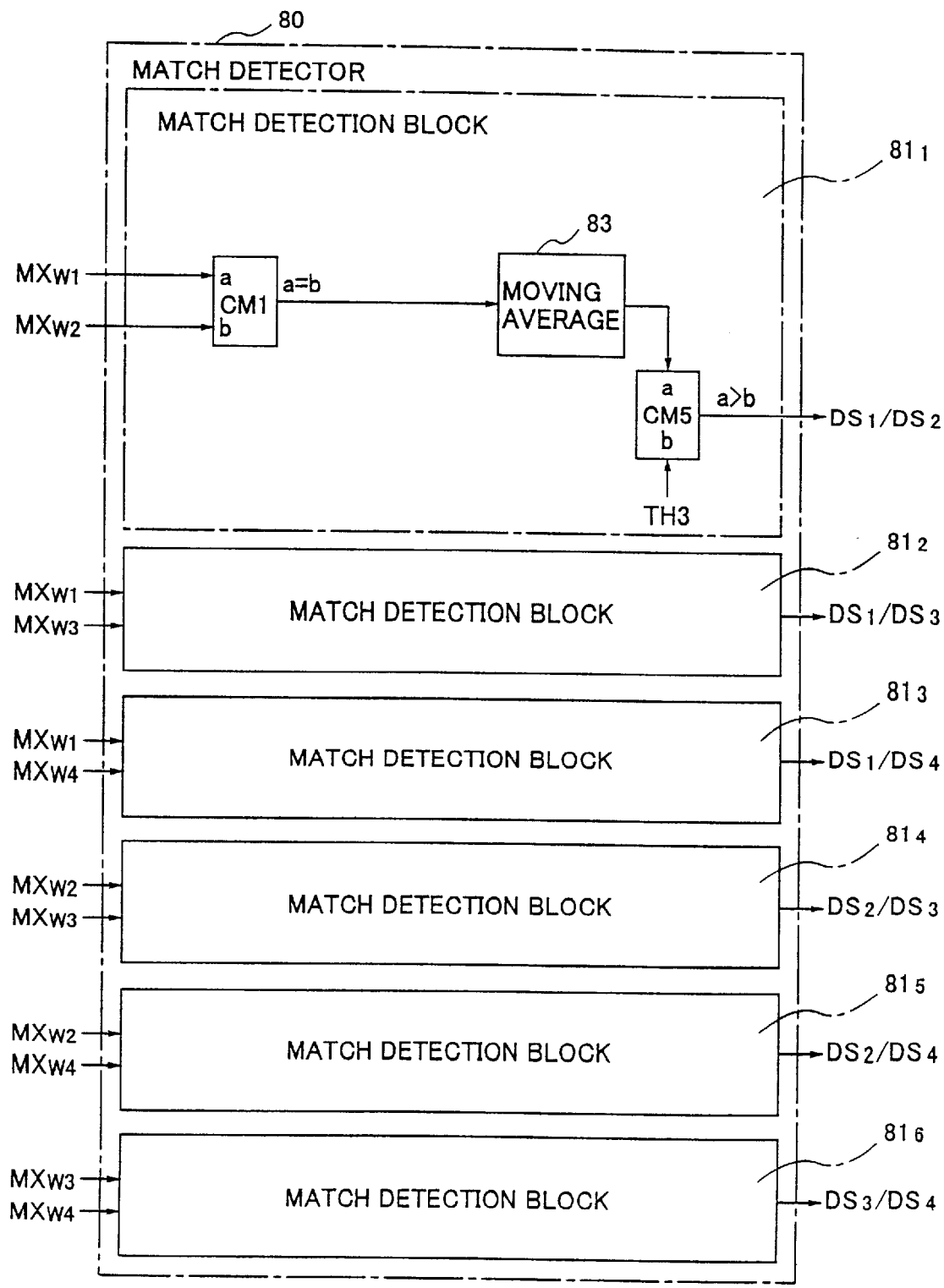
FIG. 29 is a system block diagram showing a construction of a match detector of the fifth embodiment.

FIG. 29 shows a construction of the match detector 80 of this fifth embodiment. Similarly as described above, when determining whether 2 arbitrary Walsh codes match of the 4 Walsh codes MXw1 through MXw4, 6 combinations are possible. Hence, match detection blocks $81_1$ through $81_6$ detect the match for the 6 possible combinations. For example, in the match detection block $81_1$, a comparator CM1 compares the Walsh code numbers MXw1 (a) and MXw2 (b), and outputs a match detection signal (a=b) which is "1" if a=b. A moving average unit 83 obtains a moving average of the match detection signal which is "1" or "0". A comparator CM5 compares an output (a) of the moving average unit 83 and a predetermined threshold value TH3 (b), and sets the finger lock disable signal DS1 or DS2 with respect to the corresponding finger $34_1$ or $34_2$ to DS1=1 or DS2=1 if a>b. As a result, the combining of the finger $34_1$ or $34_2$ is disabled, and unnecessary combining of the finger is prevented. The other match detection blocks $81_2$ through $81_6$ operate similarly to the match detection block $81_1$ described above.

Figure 30:
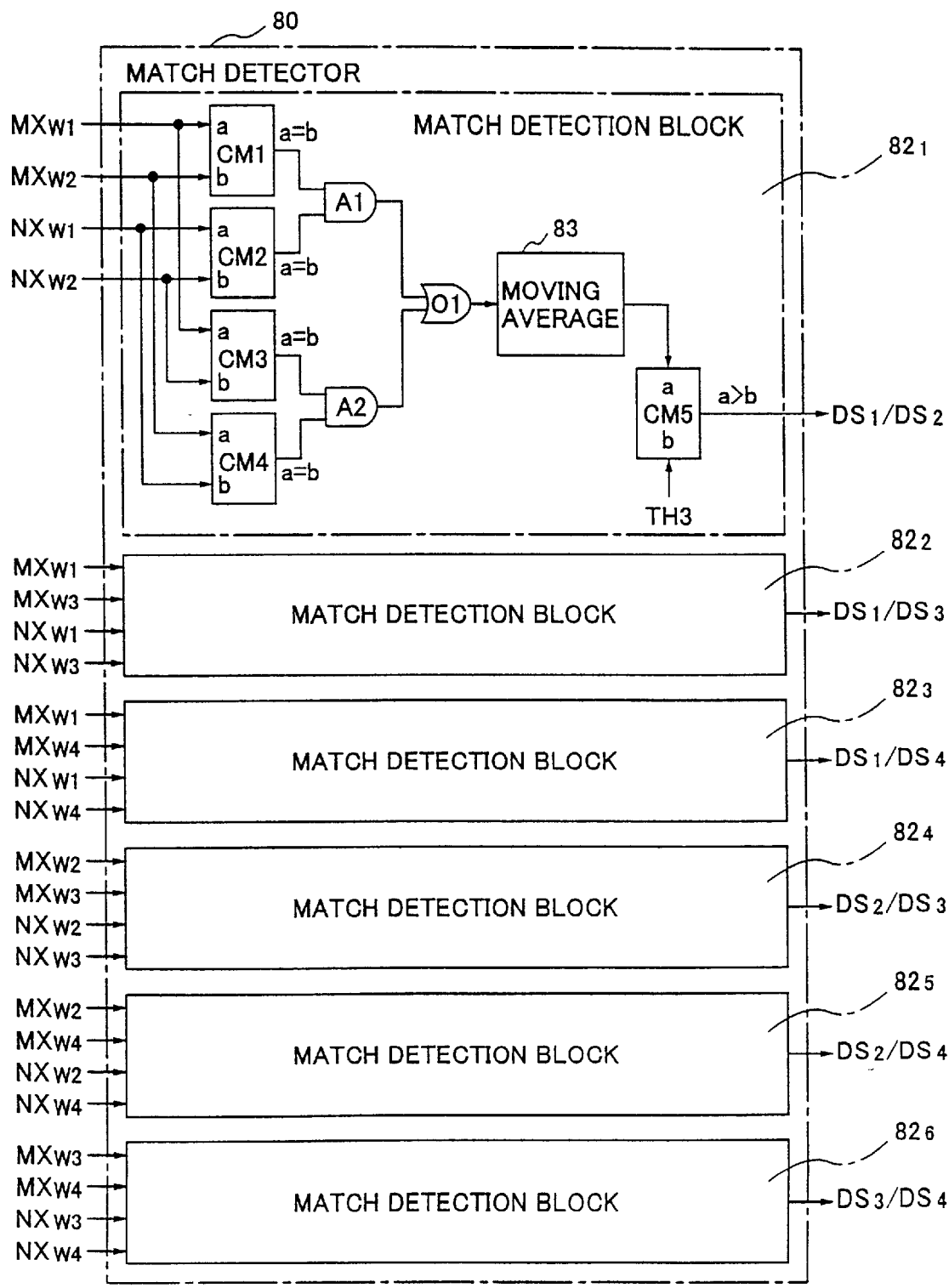
FIG. 30 is a system block diagram showing another construction of the match detector of the fifth embodiment.

FIG. 30 is a system block diagram showing another construction of the match detector 80 of the fifth embodiment. In this case, the maximum code extracting units MXD1 through MXD4 shown in FIG. 28 extract maximum Walsh code numbers MXw1 through MXw4 and second largest Walsh code numbers NXw1 through NXw4. The maximum Walsh code numbers MXw1 through MXw4 respectively correspond to the maximum values MXE1 through MXE4 of the correlation energies $E_{00}$ through $E_{63}$ of the fingers $34_1$ through $34_4$. The second largest Walsh code numbers NXw1 through NXw4 respectively correspond to the second largest values NXE1 through NXE4 of the correlation energies $E_{00}$ through $E_{63}$ of the fingers $34_1$ through $34_4$.

For example, in a match detection block $82_1$, a comparator CM1 detects whether or not the maximum Walsh code numbers MXw1 and MXw2 match, and a comparator CM2 detects whether or not the second largest Walsh code numbers NXw1 and NXw2 match. An AND gate circuit A1 outputs a signal which is "1" if both the comparators CM1 and CM2 detect the match. Hence, the detected matching state is more strict than in the case shown in FIG. 29, and such a strictly matching state occurs when the reception state of the fingers $34_1$ and $34_2$ is good.

On the other hand, large amounts of noise generally exist in the mobile communication system, and both the 2 demodulated signals include chip error in most cases. In such cases, even though the 2 demodulated signals (2 demodulated Walsh codes) including the chip error are approximately the same, MXw1=wo and NXw1=w1 may be detected from the finger $34_1$ and MXw2=w1 and NXw2=w0 may be detected from the finger $34_2$. A comparator CM3 detects whether or not MXw1=wo and NXw2=wo and MXw1 and NXw2 match, and a comparator CM4 detects whether or not MXw2=w1 and NXw1=w1 and MXw2 and NXw1 match. If the match is detected in each of the comparators CM3 and CM4, a signal which is "1" is output from an AND gate circuit A2. Such a strictly matching state occurs when the reception state of the fingers $34_1$ and $34_2$ is good.

The moving average unit 83 obtains a moving average of the match detection signal from the OR gate circuit O1 which is "1" or "0". The comparator CM5 compares the output (a) of the moving average unit 83 and a predetermined threshold value TH3 (b), and sets the finger lock disable signal DS1 or DS2 with respect to the corresponding finger $34_1$ or $34_2$ to DS1=1 or DS2=1 if a>b. The other match detection blocks $82_2$ through $82_6$ operate similarly to the match detection block $82_1$ described above.

In this case, the maximum Walsh code numbers MXw1 through MXw4 to the second largest Walsh code numbers NXw1 through NXw4 are included in the comparison. However, it is of course possible to include the third and next largest Walsh code numbers in the comparison.

Moreover, it is of course possible to appropriately combine the embodiments and modifications described above to suit the needs of the radio communication apparatus.

Further, the present invention is not limited to these embodiments, but various variations and modifications may be made without departing from the scope of the present invention.

What is claimed is:

1. A radio communication apparatus which subjects each signal which is received via a multi-path and demodulated, to a Hadamard transform at each of fingers, by use of an M-ary quadrature coding scheme, obtains correlation values of codes, combines correlation values output from fingers which obtain valid correlation values, and demodulates a received signal based on a maximum correlation value of combined correlation values, said radio communication apparatus comprising:

an operation unit which obtains a difference between a maximum value and a second largest value of the correlation values of a corresponding one of the fingers; and a lock controller which enables and locks the correlation values output from said corresponding one of the fingers when the difference obtained by said operation unit is greater than or equal to a predetermined value.

2. The radio communication apparatus as claimed in claim 1, wherein said operation unit comprises:

a maximum value detector which detects a maximum value from the correlation values input from said corresponding one of the fingers;

a decoder which decodes an input port of a correlation value corresponding to the maximum value detected by said maximum value detector; and a detection controller which holds the maximum value which is detected by said maximum value detector when a detection is made a first time, and disabling and unlocking input of the correlation value at an input port specified by said decoder when the detection is made a second time.

3. The radio communication apparatus as claimed in claim 1, wherein the correlation values are obtained by carrying out a QPSK modulation with respect to M-ary quadrature codes at a transmitting end, carrying out a QPSK demodulation at a receiving end, carrying out an Hadamard transform using an Mary quadrature code sequence with respect to demodulated signals I and Q to obtain correlation values (I1 through In) and (Q1 through Qn) of the codes, and finally obtaining sums of squares $(1 1^2+Qn^2)$ through $(1n^2+Qn^2)$.

4. The radio communication apparatus as claimed in claim 3, wherein the demodulated signals subject to the Hadamard transform are obtained by carrying out a spreading using a predetermined code at the transmitting end, and carrying out a despreading using the same predetermined code at the receiving end.

5. A radio communication apparatus which subjects each signal which is received via a multi-path and demodulated, to a Hadamard transform at each of fingers, by use of an M-ary quadrature coding scheme, obtains correlation values of codes, combines correlation values output from fingers which obtain valid correlation values, and demodulates a received signal based on a maximum correlation value of combined correlation values, said radio communication apparatus comprising:

a maximum value detector which obtains a maximum correlation value of a corresponding one of the fingers;

a combining unit which combines, at a predetermined ratio, the maximum correlation value obtained by said maximum value detector and a maximum correlation value obtained after combining the fingers; and a lock controller which enables and locks output of the correlation values from said corresponding one of the fingers when an output of said combining unit is greater than or equal to a predetermined value.

6. The radio communication apparatus as claimed in claim 5, wherein said combining unit combines the maximum correlation value obtained after combining the fingers, at the predetermined ratio, on condition that said lock controller enables and locks the output of the correlation values from said corresponding one of the fingers.

7. The radio communication apparatus as claimed in claim 5, which further comprises:

a code generator which generates an M-ary quadrature code corresponding to the maximum correlation value of said corresponding one of the fingers; and a comparator which compares the M-ary quadrature code generated by said code generator and an M-ary quadrature code corresponding to the maximum correlation value obtained after combining the fingers, said combining ,unit combining the maximum correlation value obtained after combining the fingers, at the predetermined ratio, on condition that the M-ary quadrature codes compared in said comparator match.

8. The radio communication apparatus as claimed in claim 7, which further comprises:

a moving average unit which obtains a moving average of an output of said comparator indicating a match or no match, said combining unit combining the maximum correlation value obtained after combining the fingers, at the predetermined ratio, on condition that an output of said moving average unit is greater than or equal to a predetermined value.

9. The radio communication apparatus as claimed in claim 7, said combining unit combines the maximum correlation value obtained after combining the fingers, at the predetermined ratio, on condition that said lock controller enables and locks the output of the correlation values from said corresponding one of the fingers.

10. The radio communication apparatus as claimed in claim 5, wherein the correlation values are obtained by carrying out a QPSK modulation with respect to M-ary quadrature codes at a transmitting end, carrying out a QPSK demodulation at a receiving end, carrying out an Hadamard transform using an Mary quadrature code sequence with respect to demodulated signals I and Q to obtain correlation values (I1 through In) and (Q1 through Qn) of the codes, and finally obtaining sums of squares $(I1^2+Qn^2)$ through $(In^2+Qn^2)$.

11. A radio communication apparatus which subjects each signal which is received via a multi-path and demodulated, to a Hadamad transform at each of fingers, by use of an M-ary quadrature coding scheme, obtains correlation values of codes, combines correlation values output from fingers which obtain valid correlation values, and demodulates a received signal based on a maximum correlation value of combined correlation values, said radio communication apparatus comprising:

a maximum value detector which obtains a maximum correlation value of a corresponding one of the fingers;

a code generator which generates an M-ary quadrature code corresponding to the maximum correlation value of said corresponding one of the fingers;

a comparator which compares the M-ary quadrature code generated by said code generator and an M-ary quadrature code corresponding to the maximum correlation value obtained after combining the fingers;

a selector which selects the maximum correlation value of said corresponding one of the fingers or a predetermined coefficient multiple thereof when no match is detected by said comparator, and selects the maximum correlation value obtained after combining the fingers or a predetermined coefficient multiple thereof when a match is detected by said comparator; and a lock controller which enables and locks output of the correlation values from said corresponding one of the fingers when an output of said selector is greater than or equal to a predetermined value.

12. The radio communication apparatus a claimed in claim 11 which further comprises:

a moving average unit which obtains a moving average of an output of said comparator indicating the match or no match, said selector selecting the maximum correlation value obtained after combining the fingers or the predetermined coefficient multiple thereof on condition that an output of said moving average unit is greater than or equal to a predetermined value.

13. The ratio communication apparatus as claimed in claim 11, said selector selecting the maximum correlation value obtained after combining the fingers or the predetermined coefficient multiple thereof on condition that said lock controller enables and locks the output of the correlation values from said corresponding one of the fingers.

14. The radio communication apparatus as claimed in claim 11, wherein the correlation values are obtained by carrying out a QPSK modulation with respect to M-ary quadrature codes at a transmitting end, carrying out a QPSK demodulation at a receiving end, carrying out an Hadamard transform using an M-ary quadrature code sequence with respect to demodulated signals I and Q to obtain correlation values (I1 through In) and (Q1 through Qn) of the codes, and finally obtaining sums of squares ($I1^2+Qn^2$) through ($In^2+Qn^2$).

15. A radio communication apparatus which subjects each signal which is received via a multi-path and demodulated, to a Hadamard transform at each of fingers, by use of an M-ary quadrature coding scheme, obtains correlation values of codes, combines correlation values output from fingers which obtain valid correlation values, and demodulates a received signal based on a maximum correlation value of combined correlation values, said radio communication apparatus comprising a comparator which compares demodulated data for an arbitrary combination of 2 paths; and a lock controller which disables and unlocks output of the correlation values from corresponding one of the fingers based on a detection of a match or an approximate match in said comparator.

16. The radio communication apparatus as claimed in claim 15, wherein said comparator includes means for obtaining a correlation between 2 inputs.

17. The radio communication apparatus as claimed in claim 15, wherein the correlation values are obtained by carrying out a QPSK modulation with respect to M-ary quadrature codes at a transmitting end, carrying out a QPSK demodulation at a receiving end, carrying out an Hadamard transform using an M15 ary quadrature code sequence with respect to demodulated signals I and Q to obtain correlation values (I1 through In) and (Q1 through Qn) of the codes, and finally obtaining sums of squares ($I1^2+Qn^2$) through ($In^2+Qn^2$).

18. A radio communication apparatus which subjects each signal which is received via a multi-path and demodulated, to a Hadamard transform at each of fingers, by use of an M-ary quadrature coding scheme, obtains correlation values of codes, combines correlation values output from fingers which obtain valid correlation values, and demodulates a received signal based on a maximum correlation value of combined correlation values, said radio communication apparatus comprising:

a comparator which compares M-ary quadrature codes corresponding to maximum correlation values obtained for an arbitrary combination of 2 fingers; and a lock controller which disables and unlocks output of the correlation values from one of the 2 fingers when a match is detected by said comparator.

19. The radio communication apparatus as claimed in claim 18, wherein said comparator compares M-ary quadrature codes corresponding to the maximum correlation values and second largest correlation values obtained for the arbitrary combination of the 2 fingers.

20. The radio communication apparatus as claimed in claim 18, wherein said comparator includes means for obtaining a correlation between 2 inputs.

21. The radio communication apparatus as claimed in claim 18, wherein the correlation values are obtained by carrying out a QPSK modulation with respect to M-ary quadrature codes at a transmitting end, carrying out a QPSK demodulation at a receiving end, carrying out an Hadamard transform using an M-ary quadrature code sequence with respect to demodulated signals I and Q to obtain correlation values (I1 through In) and (Q1 through Qn) of the codes, and finally obtaining sums of squares ($I1^2+Qn^2$) through ($In^2+Qn^2$).

\* \* \* \* \*